United States Patent [19]
Koh et al.

[11] Patent Number: 5,745,661
[45] Date of Patent: Apr. 28, 1998

[54] COMPOSITE-IMAGE FORMING APPARATUS WITH CONTROL OF RECOVERY OPERATION FROM JAMMED STATE

[75] Inventors: Shokyo Koh, Kawasaki; Yoshihiko Suzuki, Tokyo; Hideto Kohtani, Yokohama; Satoru Kutsuwada, Kawasaki; Ken Kuroda; Masahiro Iwadate, both of Yokohama, all of Japan

[73] Assignee: Canon Kabushiki Kaisha, Tokyo, Japan

[21] Appl. No.: 624,933

[22] Filed: Mar. 27, 1996

Related U.S. Application Data

[63] Continuation of Ser. No. 274,851, Jul. 14, 1994, abandoned.

[30] Foreign Application Priority Data

Jul. 23, 1993 [JP] Japan .................. 5-202603

[51] Int. Cl.$^6$ .................................. H04N 1/00
[52] U.S. Cl. .................. 395/113; 358/437; 358/450; 399/19
[58] Field of Search ................ 358/400, 405, 358/406, 434–437, 468, 447, 448, 450, 452, 453, 540; 395/113, 115, 111; 355/206–209; 399/81–85, 16–21; H04N 1/00, 1/387

[56] References Cited

U.S. PATENT DOCUMENTS

| | | | |
|---|---|---|---|
| 4,748,662 | 5/1988 | Hirata | 358/437 |
| 4,970,599 | 11/1990 | Nobuta | 358/437 |
| 5,010,363 | 4/1991 | Higashio et al. | 355/206 |
| 5,034,771 | 7/1991 | Makita | 355/206 |
| 5,105,229 | 4/1992 | Ozaki | 355/206 |
| 5,245,368 | 9/1993 | Farrell et al. | 358/468 |
| 5,258,779 | 11/1993 | Serizawa et al. | 395/111 |
| 5,266,996 | 11/1993 | Wakamiya et al. | 358/437 |
| 5,309,245 | 5/1994 | Hayashi et al. | 358/450 |
| 5,333,062 | 7/1994 | Hara et al. | 358/437 |

*Primary Examiner*—Kim Vu
*Attorney, Agent, or Firm*—Fitzpatrick, Cella, Harper & Scinto

[57] ABSTRACT

An image forming apparatus includes a unit for inputting image information from an external apparatus, a unit for forming an image on a recording medium, a unit for reading an original, a unit for detecting a jam of the recording medium, a unit for being manually operated by an operator, and a unit for controlling a recovery operation from a jammed state. The apparatus includes a first mode for forming an image corresponding to the input image information, and a second mode for forming a composite image by synthesizing the image corresponding to the input image information with an image of the original read by the reading unit. The control unit starts the recovery operation from the jammed state in response to release of the jam in the first mode, and starts the recovery operation from the jammed state in response to a manual operation of the operation unit by the operator after release of the jam in the second mode.

22 Claims, 43 Drawing Sheets

COMPOSITE-IMAGE FORMING APPARATUS WITH CONTROL OF RECOVERY OPERATION FROM JAMMED STATE

This application is a continuation of application Ser. No. 08/274,851, filed Jul. 14, 1994, now abandoned.

BACKGROUND OF THE INVENTION

1. Field of the Invention

This invention relates to a composite-image forming apparatus, which includes a scanner unit for reading an image of an original and a printer unit, and which can form a composite image made of the image of the original and an image formed based on data input from an external apparatus while being connected thereto.

2. Description of the Related Art

Composite-image forming apparatuses, each of which includes a scanner unit and a printer unit, and is capable of forming a composite image made of an image of an original and an image formed based on data input from an external apparatus while being connected thereto, have been proposed.

Such an apparatus includes a memory for storing image data, and inserts an image of an original in an arbitrary region of an image formed based on data input from an external apparatus to thereby obtain a composite image.

As in the case of printing a single image formed based on data input from an external apparatus, in the above-described apparatus, if a sheet jam occurs during image output in the printer unit, jam recovery processing is performed, and the printing operation is automatically resumed when it becomes possible to perform it.

Usually, in the above-described image synthesis operation, an output from the printer unit (usually binary data) and an output from the scanner unit (usually multi-value data) are synthesized. Accordingly, if priority is given to the picture quality of the output image, it is necessary to provide a large-capacity memory for storing the multivalue data, thereby causing an increase in the cost of the apparatus.

On the other hand, if priority is given to the cost of the apparatus, an image of an original is, for example, subjected to binary-coding processing, and obtained binary data are stored. Accordingly, the amount of information of the scanner image is reduced, thereby causing degradation in the picture quality of the obtained image.

In order to overcome the above-described problems, a method has been proposed, in which an image from a scanner and an image from the outside are synthesized when outputting the composite image, instead of synthesizing image data in a memory.

In this method, the two images are synthesized on a real-time basis. Accordingly, the following problems may, for example, arise. That is, when a sheet jam has occurred while outputting the composite image, if it is intended to resume the printing operation immediately after performing jam-recovering processing, as in the conventional approach, the printing operation may be resumed in a state in which the original is not set on an original mount of the apparatus, or in a state in which an original-feeding device (or an automatic document feeder if it is used) of the apparatus feeds the next original, so that the image of the original before releasing the jam and the image input from the outside cannot be synthesized and output in a normal manner after recovering the jam.

Such problems can be overcome by resuming the printing operation in consideration of the time required for the operator to return the original to an initial position. However, since the adjusting time for the operator to return the original differs depending on the operator, an image of a different original may be output when the adjusting time is long, or a long time is required until a desired composite output is obtained when the adjusting time is short, thereby causing inferior operability of the apparatus.

SUMMARY OF THE INVENTION

It is an object of the present invention to solve the above-described problems.

It is another object of the present invention to provide a composite-image forming apparatus, in which by prohibiting state recovery control after releasing a jam, detected by an abnormal sheet-feeding operation of a recording medium during processing in an image synthesis mode, until an instruction to release the jam is transmitted from an operation unit, image synthesis processing can be resumed for an appropriate original and at an appropriate timing even if variations are present in the adjusting time required for the operator to release the jam from the detection of the abnormal sheet-feeding operation.

It is still another object of the present invention to provide an image forming apparatus which includes a plurality of kinds of modes for forming a composite image, and which can perform appropriate jam recovery in accordance with a selected mode.

According to one aspect, the present invention, which achieves these objectives, relates to an image forming apparatus comprising means for inputting image information from an external apparatus, means for forming an image on a recording medium, means for reading an original, means for detecting a jam of the recording medium, means for being manually operated by an operator, and means for controlling a recovery operation from a jammed state. The apparatus includes a first mode for forming an image corresponding to the input image information, and a second mode for forming a composit image by synthesizing the image corresponding to the input image information with an image of the original read by the reading means. The control means starts the recovery operation from the jammed state in response to release of the jam in the first mode, and starts the recovery operation from the jammed state in response to a manual operation of the operation means by the operator after release of the jam in the second mode.

According to another aspect, the present invention, which achieves these objectives, relates to a composite-image forming apparatus, to which an automatic original-feeding device for feeding an original to an original-reading position can be connected, comprising first image input means for converting an image of the original into a first image signal and for inputting the first image signal, image output means for forming an image on a recording medium based on the input first image signal, second image input means for inputting desired second image information from the outside, region assignment means for assigning a desired output image region within the second image information input from the outside, synthesis means for synthesizing the second image information corresponding to the desired output image region assigned by the region assignment means with the first image information, detection means for detecting an abnormal feeding state and a released state from abnormal feeding of the recording medium fed to image output means, and control means for prohibiting an operation state of the image output means from returning to a state present before the abnormal feeding state has been detected, by determining a state of setting of an image synthesis mode by the synthesis means, and a state of an input indicating the completion of release of the abnormal feeding after the detection means has detected the released state from abnormal feeding, and for returning the operation state of the image output means to the state present before the abnormal feeding state has been detected based on a release instruction which has been input.

In the present invention, the control means prohibits the operating state of the image output means from returning to a state present before the abnormal feeding state has been detected, by determining a state of setting of an image synthesis mode by the synthesis means, and a state of an input indicating the completion of release of the abnormal feeding after the detection means has detected the released state from abnormal feeding, and for returning the operating state of the image output means to the state present before the abnormal feeding state has been detected based on release instruction which has been input. Hence, it is possible to resume image synthesis processing for an appropriate original and at an appropriate timing even if variations are present in the adjusting time required for the operator to release the jam from the detection of the abnormal sheet feeding.

The foregoing and other objects, advantages and features of the present invention will become more apparent from the following detailed description of the preferred embodiments taken in conjuction with the accompanying drawings.

DETAILED DESCRIPTION OF THE PREFERRED EMBODIMENTS

Preferred embodiments of the present invention will now be described with reference to the drawings.

Figure 1:
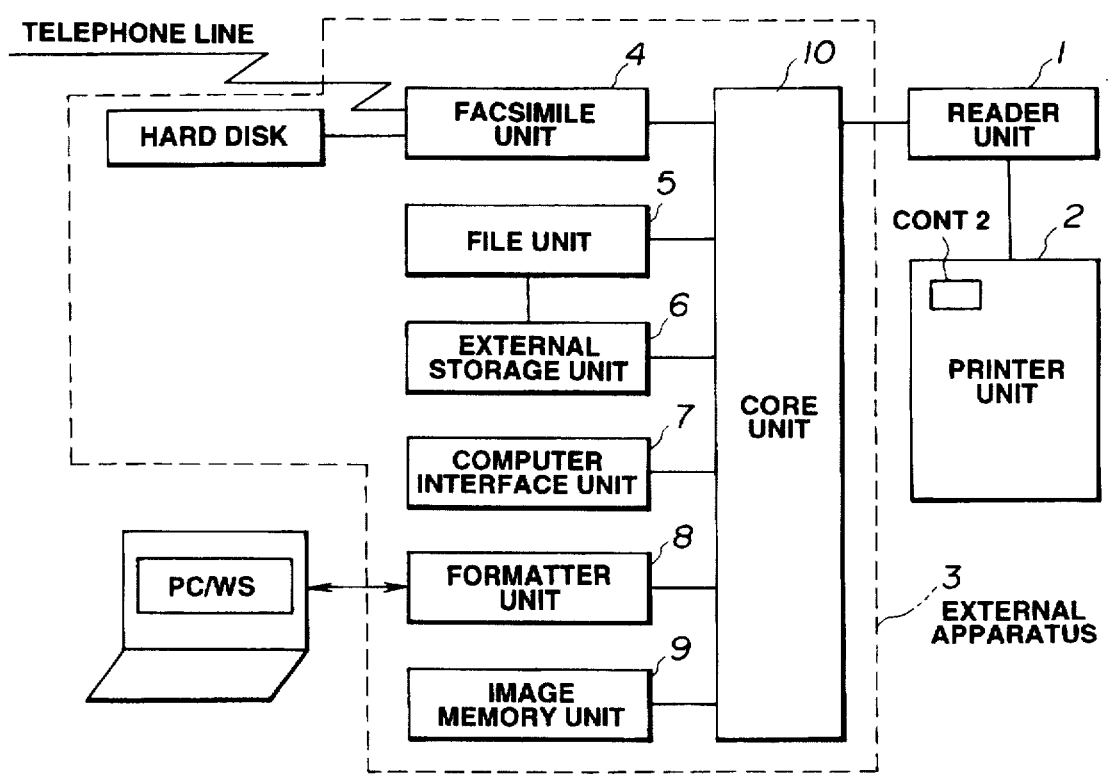
FIG. 1 is a block diagram illustrating the configuration of a composite-image forming apparatus according to an embodiment of the present invention.

FIG. 1 is a block diagram illustrating the configuration of a composite-image forming apparatus according to an embodiment of the present invention.

In FIG. 1, an image input apparatus (a reader unit) 1, serving as first image input means, converts an image of an original into image data. An image output apparatus (a printer unit) 2, serving as image output means, includes a plurality of kinds of recording-paper cassettes, and outputs image data onto a sheet of recording paper as a visual image in response to a print command. An external apparatus 3 is electrically connected to the reader unit 1, and has various kinds of functions. That is, the external apparatus 3, serving as second image input means, includes a facsimile unit 4, a file unit 5, an external storage unit 6 connected to the file unit 5, a computer interface unit 7 for connecting a computer to a LAN (local area network), a formatter unit 9 for visualizing information from the computer, an image memory 9 for storing information from the reader unit 1, and temporarily storing information transmitted from the computer, and a core unit 10 for controlling processing performed by each of the above-described respective units.

Figure 10:
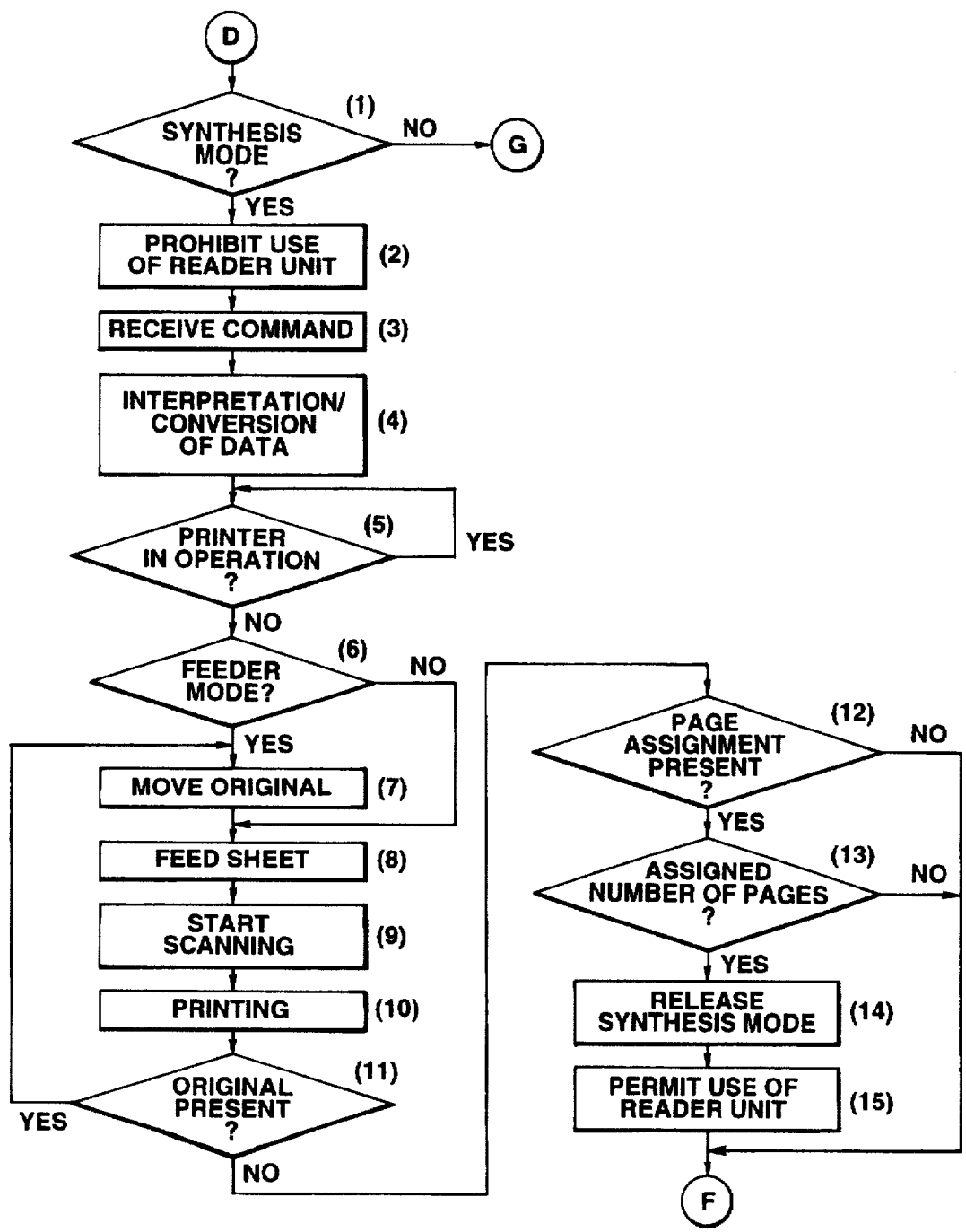
FIG. 10 is a flowchart illustrating an image synthesis processing procedure in the composite-image forming apparatus shown in FIG. 1.

In the image forming apparatus having the above-described configuration, after a released state from abnormal sheet feeding, such as a jam or the like, has been detected, a printer control unit CONT 2 prohibits the operation state of the printer unit 2 from returning to a state present before the abnormal feeding has been detected, by determining a state of setting an image synthesis mode and a state of an input indicating the completion of release of the abnormal feeding by the core unit 10, and returns the operating state of the printer unit 2 to the state present before the abnormal feeding has been detected, according to a flowchart shown, for example, in FIG. 10 (to be described later) based on an input release instruction during the prohibited state. Hence, it is possible to resume image synthesis processing for an appropriate original and at an appropriate timing even if variations are present in the adjusting time required for the operator to release a jam from the detection of the abnormal sheet feeding.

Figure 2:
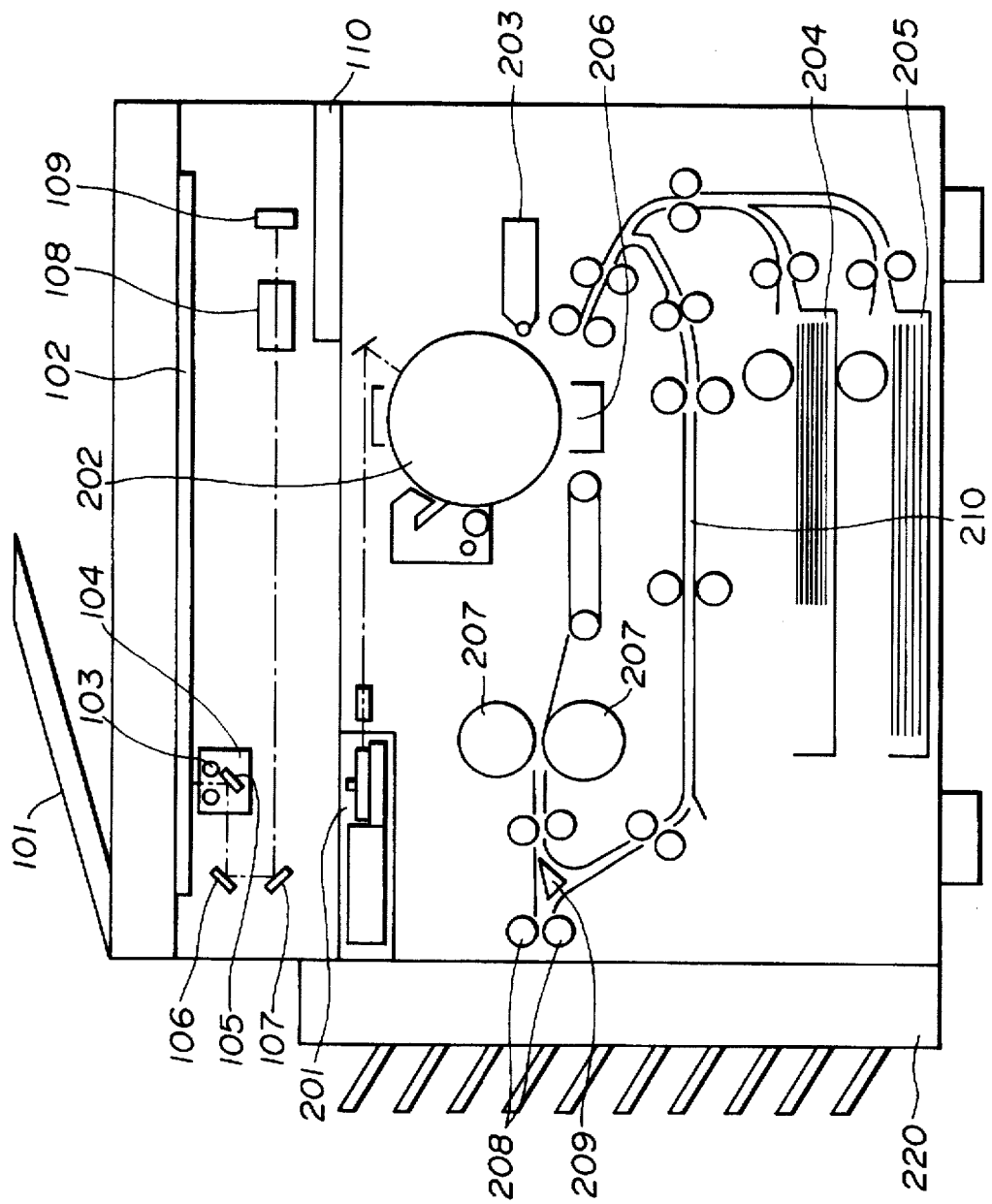
FIG. 2 is a cross-sectional view illustrating the configuration of a reader unit and a printer unit shown in FIG. 1.

FIG. 2 is a cross-sectional view illustrating the configuration of the reader unit 1 and the printer unit 2 shown in FIG. 1. A description will be provided of the mechanical configuration and the operation of the apparatus.

Originals mounted on an original feeding device 101 are individually fed onto an original-mount glass surface 102. When an original has been fed to a predetermined position on the glass surface 102, a lamp 103 of a scanner unit 104 is turned on, and the scanner unit 104 moves to illuminate the original. Reflected light from the original is input to a CCD (charge-coupled device) image sensor (hereinafter termed a CCD) 109 via mirrors 105, 106 and 107, and a lens 108.

The reflected light from the original sensed by the CCD 109 is subjected to photoelectric conversion. The obtained electrical signal is subjected to various kinds of processing in an image processing unit 110. The image processing unit 110 includes a switching circuit (to be described later) for switching the signal from the reader unit 1 to the printer unit 2 or to the external apparatus 3, and also has a function of selecting one of the signal from the reader unit 1 and a signal from the external apparatus 3, and connecting the selected signal to the printer unit 2.

The electrical signal connected to the printer unit 2 by the switching circuit of the image processing unit 110 is converted into a modulated optical signal by an exposure control unit 201 to illuminate a photosensitive member 202. A latent image formed on the photosensitive member 202 by the illuminating light is developed by a developing unit 203. A sheet of transfer paper is conveyed from a transfer-paper mounting unit 204 or a transfer-paper mounting unit 205 with a timing adjusted to the leading end of the latent image, and the developed image is transferred onto the sheet by a transfer unit 206. The transferred image is fixed by a fixing unit 207, and is then discharged outside the apparatus from a sheet-discharging unit 208. The sheet output from the sheet-discharging unit 208 is discharged onto a corresponding bin when a sorting function of a sorter 220 operates.

When the sorting function of the sorter 220 does not operate, the sheet is discharged onto the uppermost bin of the sorter 220.

Next, a description will be provided of a method of sequentially outputting read images onto two surfaces of a single sheet of transfer paper.

The sheet of transfer paper fixed by the fixing unit 207 is conveyed to the sheet-discharging unit 208, and is then conveyed in the reverse direction to a mounting unit 210 for transfer paper to be refed via a conveying-direction switching member 209. When the next original has been prepared, the image of the original is read in the above-described manner, and the sheet is fed from the mounting unit 210. Thus, the images of two originals can be output on the surface and the back of a single sheet of transfer paper.

As shown in FIG. 1, the external apparatus 3 is connected to the reader unit 1 via a cable, and the core unit 10 within the external apparatus 3 controls signals and the respective units. As described above, the external apparatus 3 includes the facsimile unit 4 for performing facsimile transmission/ reception, the file unit 5 for converting information relating to various kinds of originals into electrical signals and storing the signals on a magnetooptical disk, the formatter unit 8 for developing code information from the computer into image information, the computer interface unit 7 for performing an interfacing operation between the LAN and the computer, the image memory unit 9 for storing information from the reader unit 1 and for temporarily storing information transmitted from the computer, and the core unit 10 for controlling the respective units.

Figure 3:
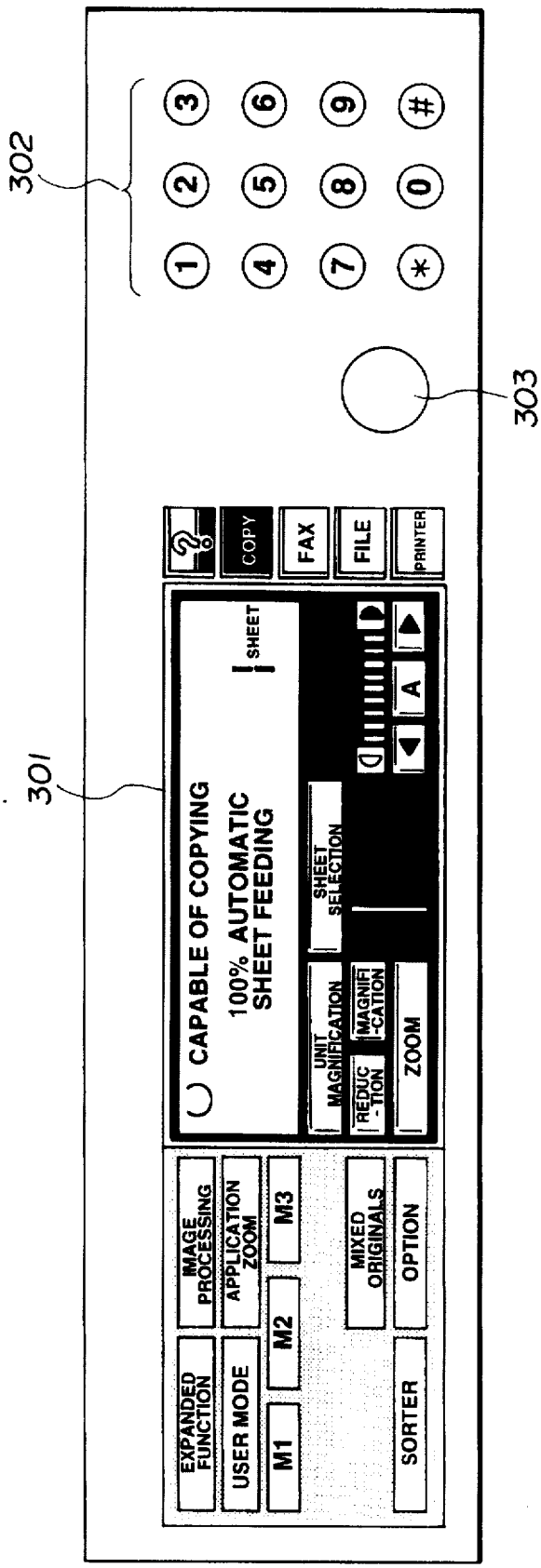
FIG. 3 is a plan view illustrating an operation panel disposed on the reader unit shown in FIG. 1.

FIG. 3 is a plan view illustrating an operation panel disposed on the reader unit 1 shown in FIG. 1.

In FIG. 3, a display unit 301 displays operation states and messages. The surface of the display unit 301 comprises a touch panel, so that it functions as selection keys by being touched. Ten keys 302 are used for inputting numerals. An operation is started by depressing a start key 303.

A description will now be provided of operations of respective functions in the composite-image forming apparatus of the present embodiment with reference to the flowcharts shown in FIGS. 4 through 9.

FIGS. 4 through 9 are flowcharts illustrating processing procedures of respective functions in the composite-image forming apparatus of the present embodiment. In each of the flowcharts, numerals (1), (2), . . . represent steps.

Figure 4:
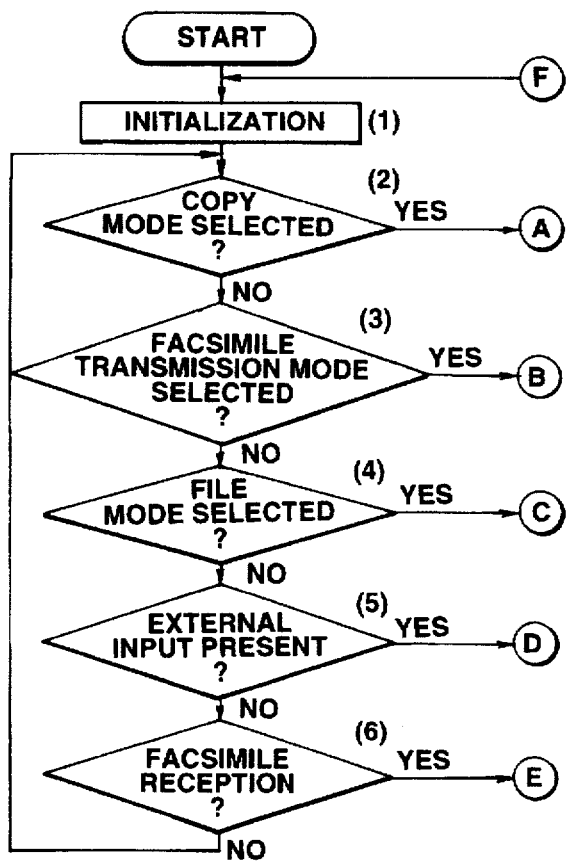
FIGS. 4 through 9 are flowcharts illustrating processing procedures of respective functions in the composite-image forming apparatus shown in FIG. 1.

First, in FIG. 4, after power has been supplied, initialization is performed (step (1)). Operation-mode selection keys are displayed on the display unit 301 of the operation panel, and a mode is selected by touching a key corresponding to the mode. Then, it is determined if the selected mode is a copy mode (step (2)). If the result of the determination is affirmative, the process proceeds to step (1) shown in FIG. 5.

If the result of the determination in step (2) is negative, it is determined if a facsimile transmission mode is selected (step (3)). If the result of the determination is affirmative, the process proceeds to step (1) shown in FIG. 6.

If the result of the determination in step (3) is negative, it is determined if a file mode is selected (step (4)). If the result of the determination is affirmative, the process proceeds to step (1) shown in FIG. 7.

If the result of the determination in step (4) is negative, it is determined if a mode of input from the computer interface unit 7 is selected (step (5)). If the result of the determination is affirmative, the process proceeds to step (1) shown in FIG. 8, usually via step (1) shown in FIG. 10.

If the result of the determination in step (5) is negative, it is determined if a facsimile reception mode is selected (step (6)). If the result of the determination is affirmative, the process proceeds to step (1) shown in FIG. 9.

If the result of the determination in step (6) is negative, the process returns to step (2), and the same processing is repeated.

Figure 5:
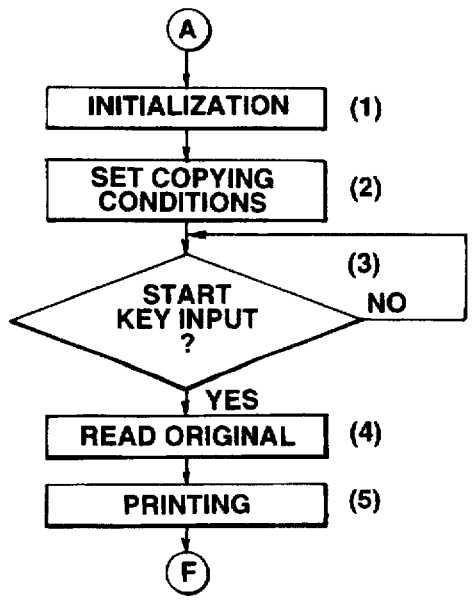

If the result of the determination in step (2) shown in FIG. 4 is affirmative, the flow shown in FIG. 5 is started. First, a copying operation is initialized (step (1)), copying conditions are then set by reading keys input from the operation panel (step (2)), and input from the start key 303 is awaited (step (3)). When the start key 303 has been depressed, the original is read by the reader unit 1 (step (4)), and printing (the above-described printing processing) is performed by the printer unit 2. After the printing has been completed, the process returns to step (1) shown in FIG. 4 in order to perform initialization.

Figure 6:
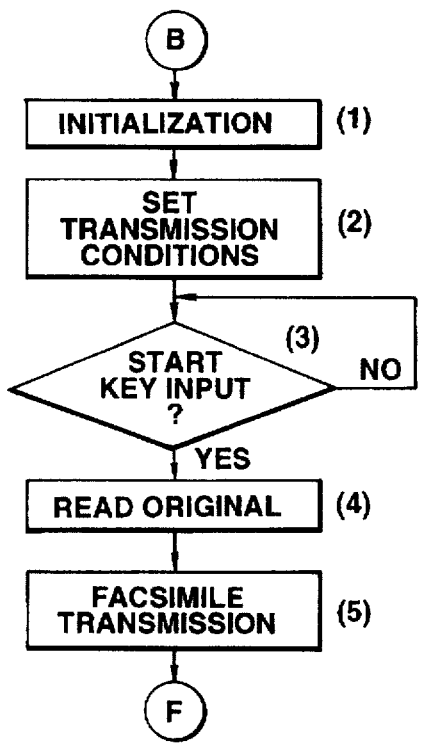

If the result of the determination in step (3) shown in FIG. 4 is affirmative, the flow shown in FIG. 6 is started. First, facsimile transmission is initialized (step (1)), facsimile transmission conditions are then set by reading keys input from the operation panel (step (2)), and input from the start key 303 is awaited (step (3)).

When the start key 303 has been depressed, the original is read by the reader unit 1 (step (4)), and image data is transmitted to the facsimile unit 4. The facsimile unit 4 performs facsimile transmission in accordance with the set format and the determined protocol (step (5)). After the transmission has been completed, the process returns to step (1) shown in FIG. 4.

Figure 7:
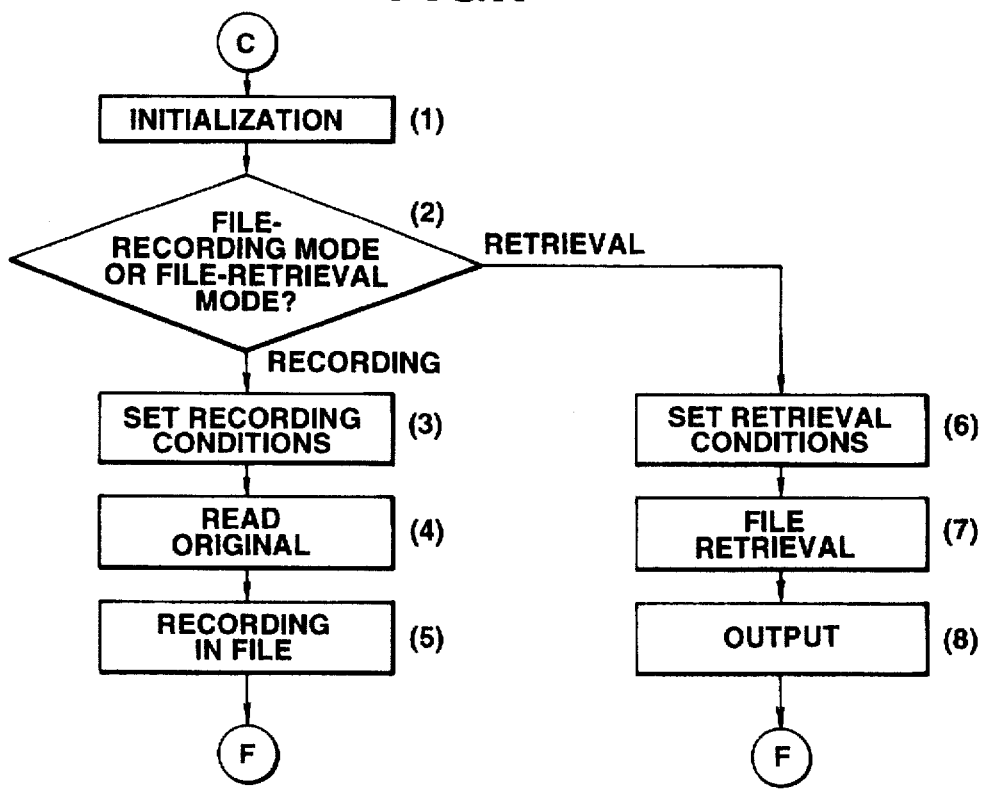

If the result of the determination in step (4) shown in FIG. 4 is affirmative, the flow shown in FIG. 7 is started. First, a file operation is initialized (step (1)). Mode selection between file recording and file retrieval is displayed on the operation panel, and a key input from the operator is awaited (step (2)). When a recording key has been selected, recording conditions are set (step (3)), the original is read by the reader unit 1 (step (4)), and data is transmitted to the file unit 5 and stored in the external storage unit 6 of the file unit 5 (step (5)).

On the other hand, when a file retrieval key has been selected in step (2), retrieval conditions are set (step (6)), file retrieval is performed from the external storage unit 6 (step (7)), and the result of the retrieval is output (step (8)). After file recording or file retrieval has been completed, the process returns to step (1) shown in FIG. 4 in order to perform initialization.

Figure 8:
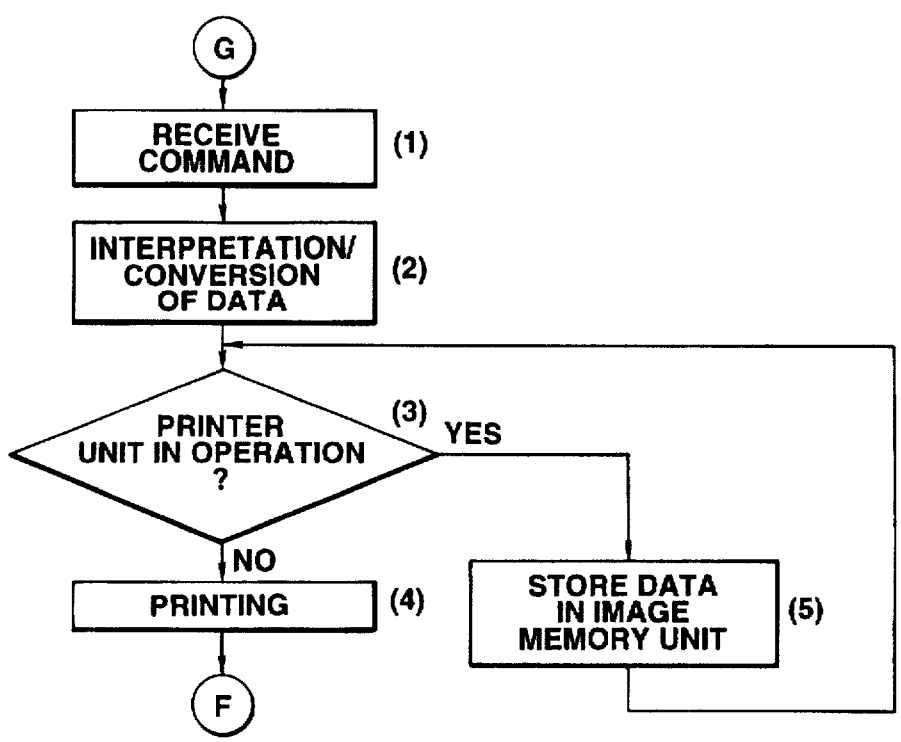

When command data has been input from the outside in the determination of step (5) shown in FIG. 4, it is determined if the selected mode is a synthesis mode in step (1) shown in FIG. 10 (to be described later). If the result of the determination is negative, the flow shown in FIG. 8 is started. First, a command is received by the computer interface unit 7 (step (1)), the received data is transmitted to the formatter unit 8 via the core unit 10, and the data is interpreted and converted into information having meaning, such as characters or the like (step (2)). In order to output the information, it is determined if the printer unit 2 is in operation (step (3)). If the result of the determination is negative, the data is printed (step (4)). The process then returns to step (1) shown in FIG. 4.

If the result of the determination in step (3) is affirmative, the data is stored in the image memory unit 9 (step (5)), the process returns to step (3), and the stored data is read and printed by the printer unit 2 while the printer unit 2 is not in operation (steps (3) and (4)). After outputting the data, the process returns to step (1) shown in FIG. 4.

Figure 9:
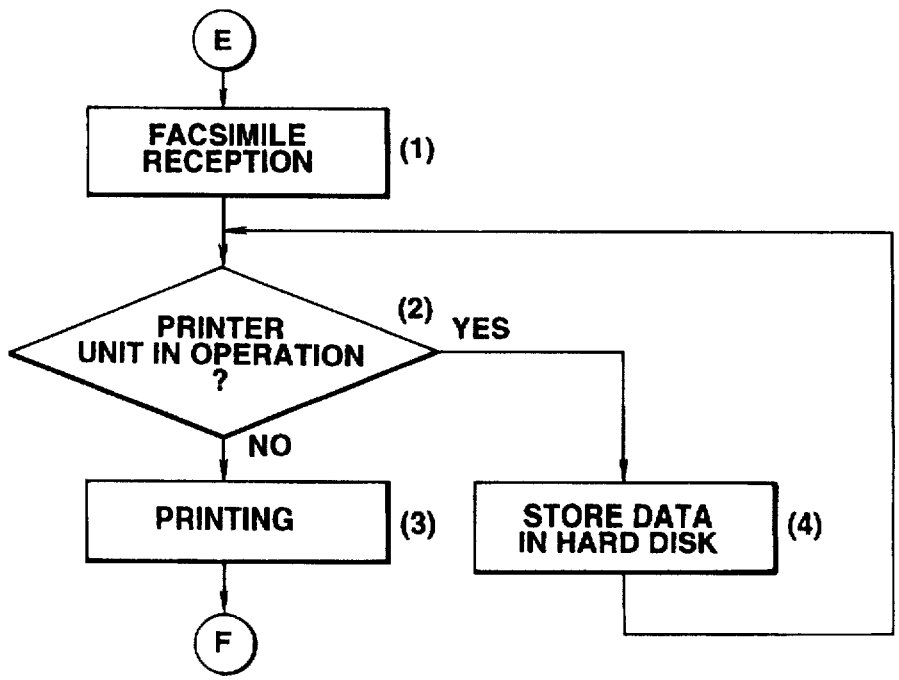

If the result of the determination in step (6) shown in FIG. 4 is affirmative, the flow shown in FIG. 9 is started. First, facsimile reception is performed by the facsimile unit 4 (step (1)). It is then determined if the printer unit 2 is in operation (step (2)). If the result of the determination is negative, received data is transmitted to the printer unit 2, and is printed (step (3)).

If the result of the determination in step (2) is affirmative, the data is stored in a hard disk (HD) of the facsimile unit 4 (step (4)). If the result of the determination in step (2) is negative, the data is printed by the printer unit 2 (steps (2) and (3)). After the printing has been completed, the process returns to step (1) shown in FIG. 4 in order to perform initialization.

Each of the above-described operations is performed by selecting a mode using a selection key on the operation panel, receiving a mode by the facsimile unit 4, or detecting a command from the outside by the computer interface unit 7.

The above-described operations may be performed by being simultaneously combined, or may be simultaneously performed independently. For example, facsimile reception/ recording and reading of an original may be simultaneously performed independently. The core unit 10 controls these operations together with setting of priority order.

Next, a description will be provided of a control operation of synthesizing image information, obtained by converting data by the formatter unit 8 in accordance with a synthesis region assigned from the respective keys 302 and 303 on the operation unit shown in FIG. 3, with an image of an original read by the reader unit 1 with reference to FIG. 10.

FIG. 10 is a flowchart illustrating a procedure image synthesis processing in the composite-image forming apparatus shown in FIG. 1. In FIG. 10, numerals (1) through (15) represent respective steps.

If the result of the determination in step (5) shown in FIG. 4 is affirmative, it is determined if a synthesis mode is selected (step (1) shown in FIG. 10). If the result of the determination is negative, the processing shown in FIG. 8 is started. If the result of the determination is affirmative, the synthesis sequence shown in FIG. 10 is started. First, a copying operation and the use of the reader unit 1 during facsimile transmission and file recording are prohibited (step (2)). This is for the purpose of preventing the target original from being replaced by an original used in a mode other than the synthesis mode while waiting for the transmission of image data obtained as a result of conversion by the formatter unit 8 after the synthesis mode has been set. As in the case of ordinary command conversion and output, the formatter unit 8 converts a command into image information, comprising, for example, characters (steps (3) and (4)). If the printer unit 2 is not in operation when the formatted image data is ready for being output as the result of the determination in step (5), it is determined if the mode of reading the image of the original is a feeder mode (step (6)). If the result of the determination is affirmative, since the state of setting of the original is monitored by a sensor (not shown) provided in the original feeding device 101 shown in FIG. 2, the original is moved to a reading position when the original is set (step (7)). Then, a sheet of transfer paper is fed from an appropriate transfer-paper mounting unit (sheet cassette 204 or 205) (step (8)), and is moved to the transfer unit 206. At that time, the scanner unit 104 is moved so that a latent image of the original is formed on the photosensitive member 202 at an appropriate timing (step (9)), and original-image data is received by the CCD 109. The obtained image-data signal and the image signal formed by the formatter unit 8 are transmitted to an exposure control unit 201 alternatively according to the assigned region by being switched by a switching circuit shown in FIG. 11 (to be described later), and printing is performed (step (10)). The printing operation is the same as the above-described operation, and therefore a description thereof will be omitted.

The configuration of the above-described switching circuit will now be described with reference to FIG. 11.

Figure 11:
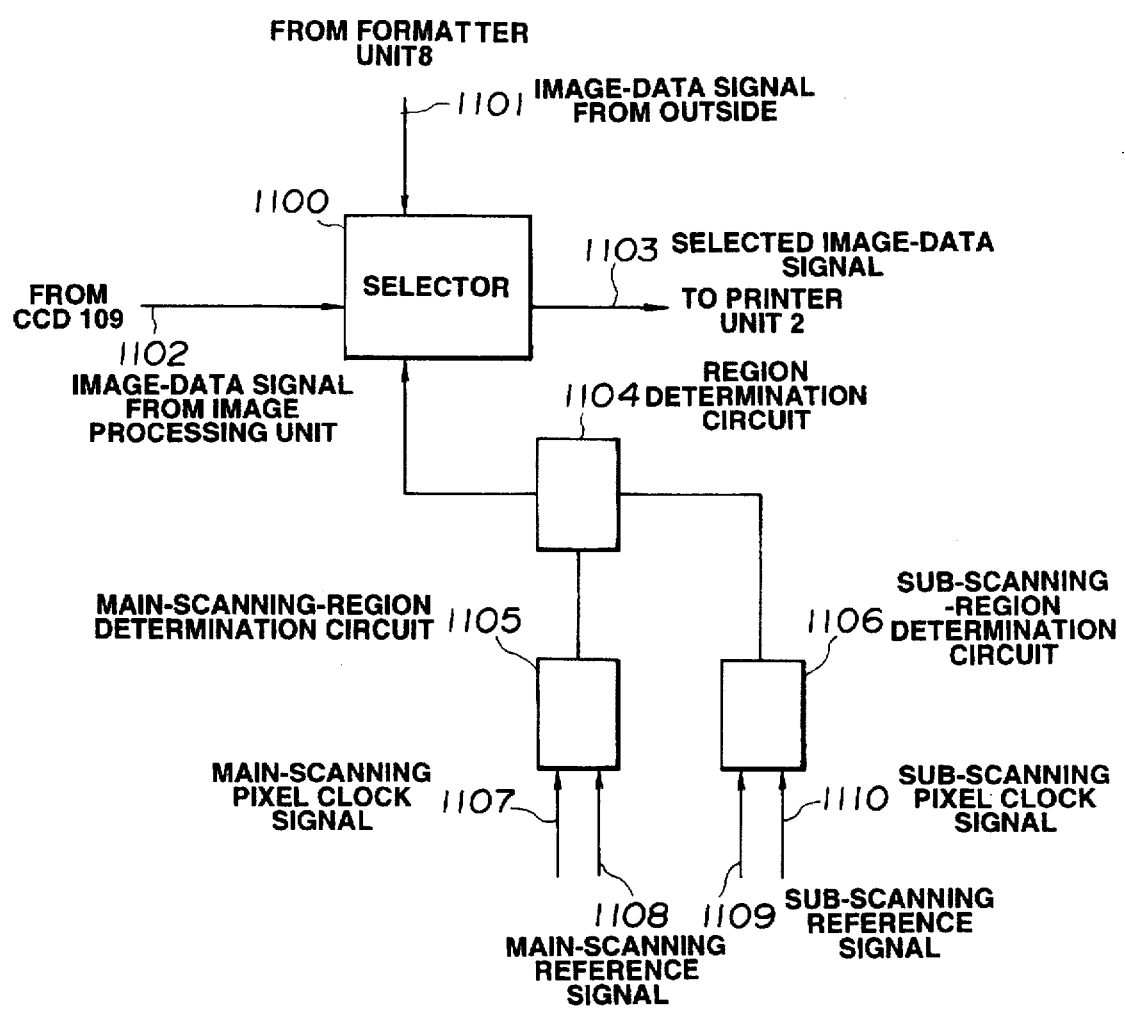
FIG. 11 is a block diagram illustrating a switching circuit in the composite-image forming apparatus shown in FIG. 1.

In FIG. 11, a selector 1100 selects one of an image-data signal 1101 from the outside and an image-data signal 1102 from the above-described image processing unit 110. A selected image-data signal 1103 is transmitted to the exposure control unit 201, and is used for forming a latent image. A circuit 1105 for determining a region in the main scanning direction and a circuit 1106 for determining a region in the sub-scanning direction determine the inside/outside of a region in the respective directions by comparing input reference signals 1108 and 1109 with region data preset by pixel clock signals 1107 and 1110 representing the positions of image data obtained as a result of conversion, respectively. Final region determination is performed by a region determination circuit 1104 based on the results of the determination in the respective directions. The result of the determination is transmitted to the selector 1100, and an output signal is selected based on the result.

Next, a description will be provided of a case in which image data of a plurality of originals are synthesized with image data from the outside with reference to the flowchart shown in FIG. 10, although partly overlapped with the foregoing description.

After a first composite image has been printed (step (10)), the original feeding device 101 determines if the next original is present (step (11)). If the result of the determination is negative, the process proceeds from the above-described process sequence. If the result of the determination is affirmative, the original is replaced (step (7)), and a sheet of transfer paper is fed in step (8).

By repeating the above-described process sequence, image data of a plurality of originals can be synthesized with image data from the outside. In the present embodiment, the formatter unit 8 can transmit the same image data to the above-described switching circuit an arbitrary number of times at a timing adjusted to the reader unit 1.

As described above, in the synthesis mode, other operations which use the reader unit 1 are prohibited. Accordingly, when the synthesis of image data of a required number of originals has been completed, it is desirable to permit other operations by releasing the synthesis mode.

A description will now be provided of a method of releasing the synthesis mode by performing page assignment.

The number of pages can be assigned from the key 303 on the operation unit. When the output of the same page has been completed for a plurality of originals, it is determined if page assignment for determining the release of the synthesis mode is present (step (12)).

If the result of the determination is affirmative, the number of pages for image data from the outside which has been output at that time is counted, and the counted number is compared with the assigned number of pages for the release.

When the counted number has reached the assigned number of pages, the synthesis mode is released (step (14)), the use of the reader unit 1 is permitted (step (15)), and the process returns to step (1) shown in FIG. 4.

Figure 12:
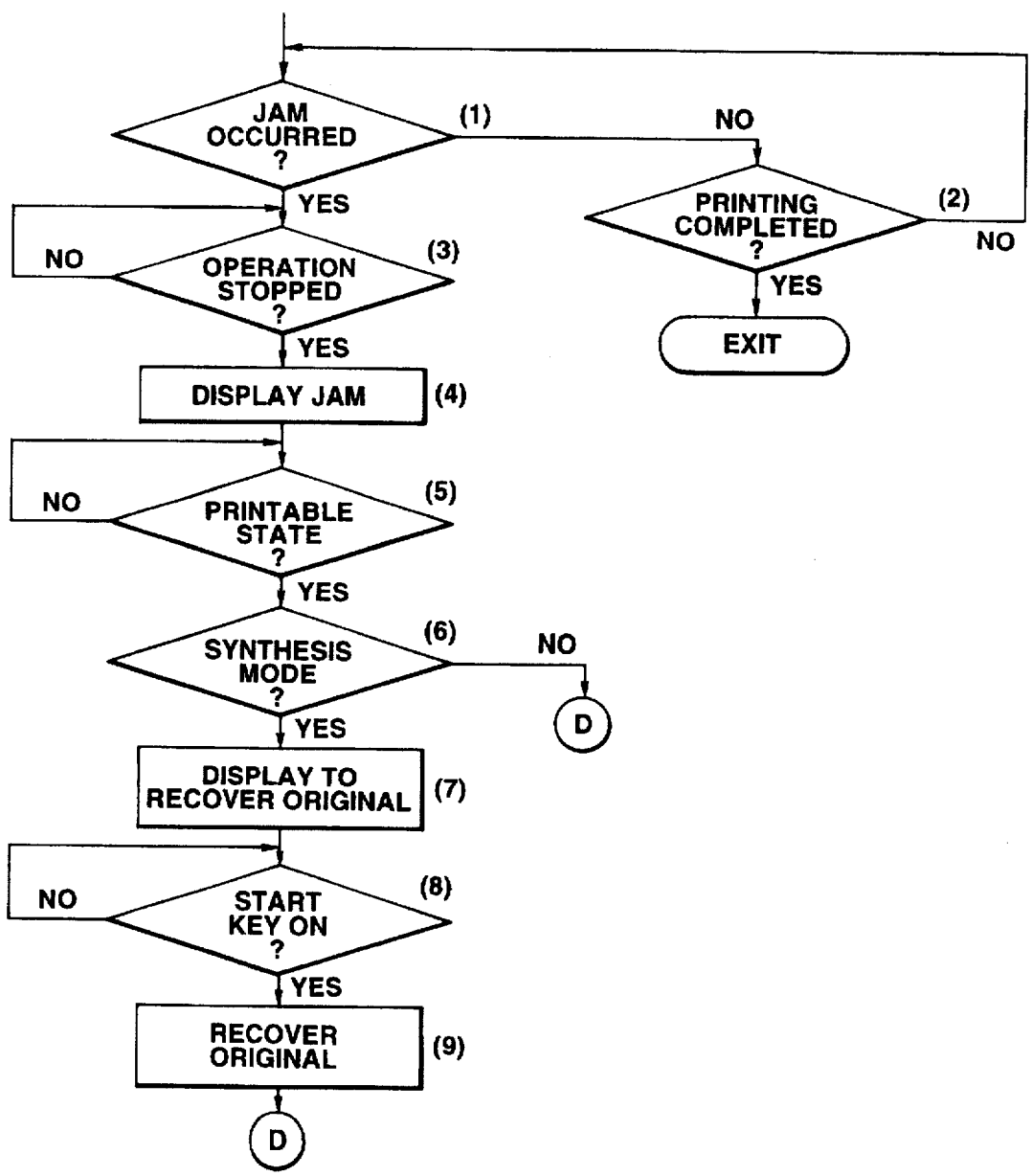
FIG. 12 is a flowchart illustrating a procedure of first jam recovery processing in the composite-image forming apparatus shown in FIG.1.

Next, a description will be provided of a jam recovery processing with reference to the flowchart shown in FIG. 12.

FIG. 12 is a flowchart illustrating a procedure of first jam recovery processing in the composite-image forming apparatus shown in FIG. 1. In FIG. 12, numerals (1) through (9) represent respective steps. The processing comprises a subroutine called from a main sequence at every constant time period or whenever necessary.

First, it is determined if a jam has occurred (step (1)). If the result of the determination is negative, it is determined if the printing operation (image forming operation) has been completed (step (2)). If the result of the determination in step (2) is affirmative, the process is terminated. If the result of the determination in step (2) is negative, the process returns to step (1).

If the result of the determination in step (1) is affirmative, the process proceeds to step (3).

In the present embodiment, a jam comprises a jam while an original is conveyed by the original feeding device 101 shown in FIG. 2, or a jam while a sheet of transfer paper is conveyed in the printer unit 2.

Accordingly, in step (3), it is determined if the operation of the printer unit 2 has been completed. For example, in the case of a jam in the original feeding device 101, the operation of the printer unit 2 is stopped after the sheet fed in the printer unit 2 has been discharged onto the sheet-discharging unit 208. If the result of the determination in step (3) is negative, the stoppage of the operation of the printer unit 2 is awaited. When the operation of the printer unit 2 has stopped, the state of the printer unit 2 is switched to an off-line state, and a display indicating the occurrence of the jam, such as "Remove the jammed sheet" or the like, is performed on the display unit 301 shown in FIG. 3 (step (4)). After the display of the jam, jam recovery processing for the printer unit 2 is performed, and it is determined if a printable state is provided based on opening/closing of the door, depressing of a dedicated switch, or the like (step (5)). If the result of the determination is affirmative, it is determined if the mode present when the jam has occurred is the synthesis mode (step (6)). If the result of the determination in step (6) is negative, the state of the printer unit 2 is switched to an on-line state, and the process proceeds to step (1) shown in FIG. 8, and the printing operation is resumed.

Figure 13:
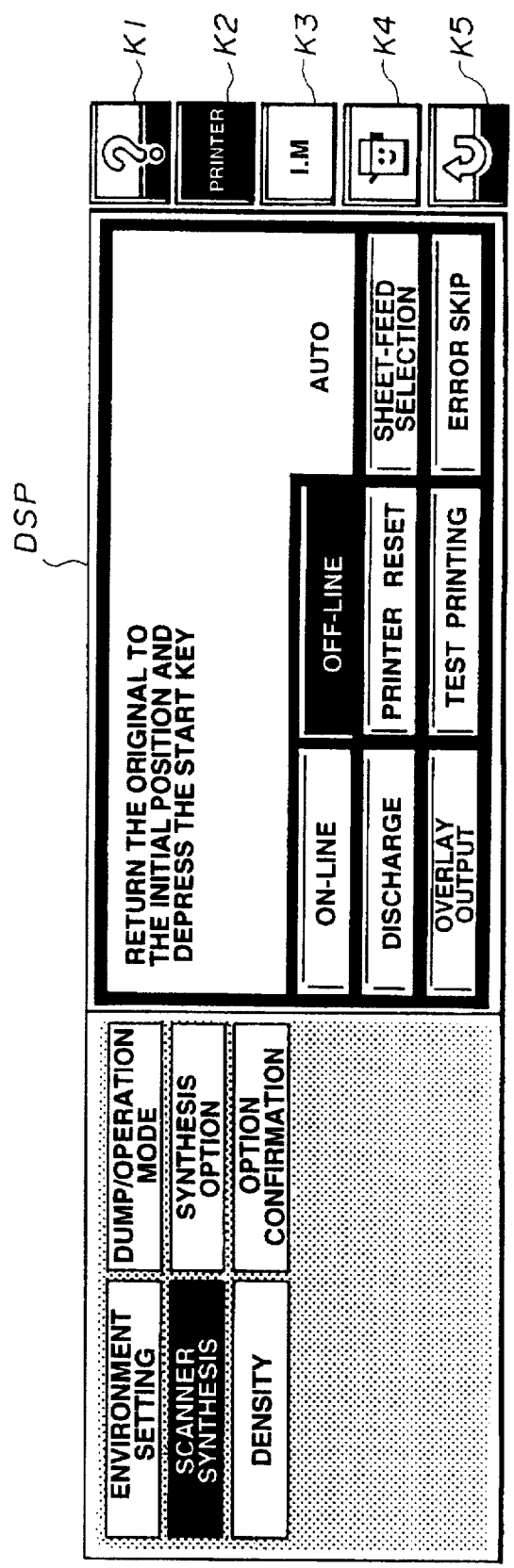
FIGS. 13 and 14 are diagrams illustrating examples of first jam recovery message display in the composite-image forming apparatus shown in FIG. 1.

If the result of the determination in step (6) is affirmative, a display to urge the operator to return the original again to the sheet-feeding position (an original recovery display), such as, as shown in FIG. 13, "Return the original to the initial position and depress the start key", is performed on the display unit 301 (step (7)). Then, the operator awaits depressing of the start key 303 (step (8)). When the start key 303 has been depressed, the original is fed to the reading position, and original recovery processing of switching the state of the printer to an on-line state, is performed (step (9)), and the process returns to step (1) shown in FIG. 10.

As described above, when synthesizing an image from the external apparatus 3 with an image read from the reader unit 1, the operator is urged to start jam recovery, so that the time to return the original to the initial position is secured, and recovery processing can be started without waiting for the start of a printing operation of the printer unit 2, or a time period more than necessary.

As a modification of the present embodiment, recovery start by the operator may make the state of the printer unit 2 an on-line state. It is thereby possible to separate recovery of a copying state from recovery of a printing operation.

Figure 14:
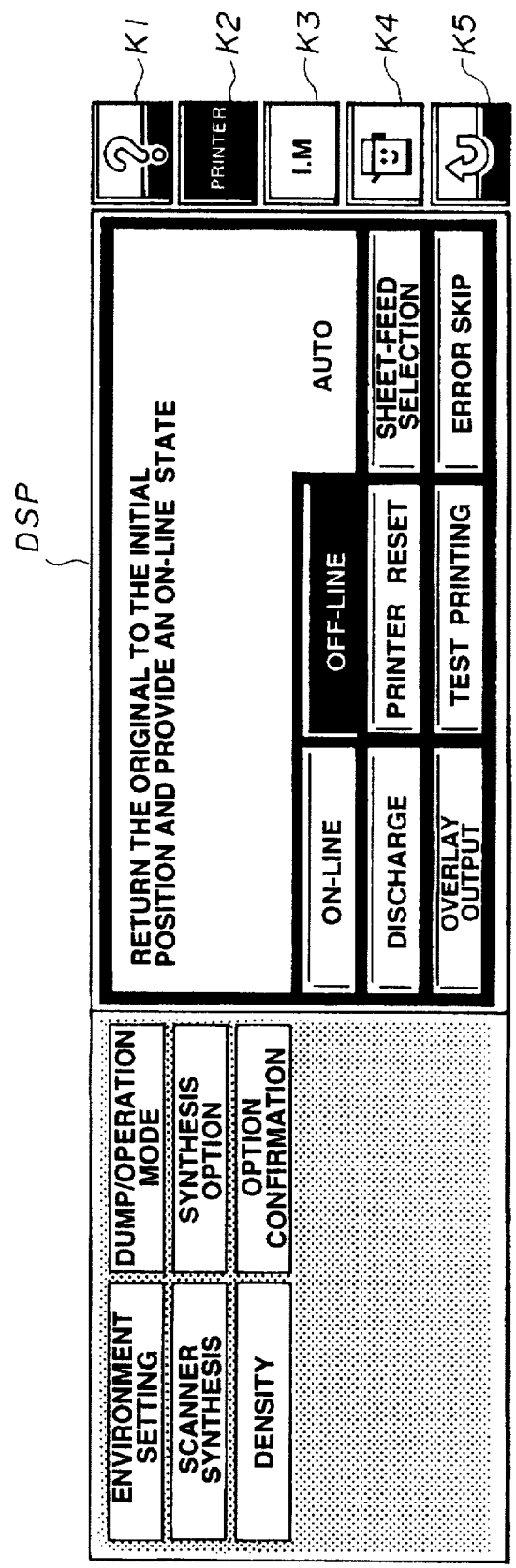

FIG. 14 is a diagram illustrating another example of recovery display in the composite-image forming apparatus shown in FIG. 1.

Instead of the display in step (7) shown in FIG. 12, as shown in FIG. 12, a display "Return the original to the initial state and provide an on-line state" is performed, and it is awaited in step (8) until the operator makes the state of the printer unit 2 an on-line state. When an on-line state has been provided, the processing shown in FIG. 8 is started.

Figure 15:
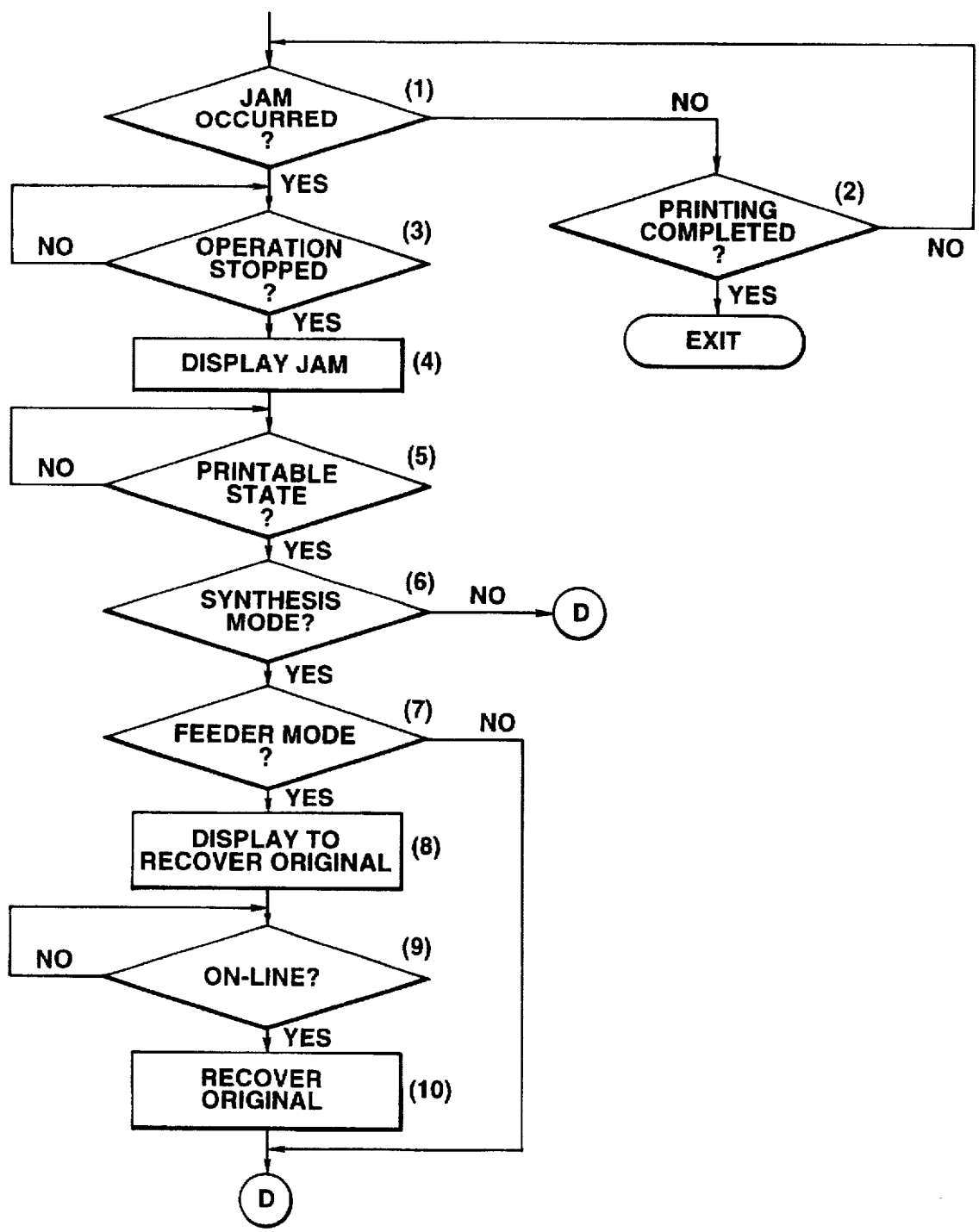
FIG. 15 is a flowchart illustrating a procedure of a second jam recovery processing in the composite-image forming apparatus shown in FIG. 1.

FIG. 15 is a flowchart illustrating a procedure of second jam recovery processing in the composite-image forming apparatus shown in FIG. 1. In FIG. 15, numerals (1) through (10) represent respective steps. The processing comprises a subroutine called from a main sequence at every constant time period, or whenever necessary.

First, it is determined if a jam has occurred (step (1)). If the result of the determination is negative, it is determined if the printing operation (image forming operation) has been completed (step (2)). If the result of the determination in step (2) is affirmative, the process is terminated. If the result of the detemination in step (2) is negative, the process returns to step (1).

If the result of the determination in step (1) is affirmative, the process proceeds to step (3).

In the present embodiment, a jam comprises a jam while an original is conveyed by the original feeding device 101 shown in FIG. 2, or a jam while a sheet of transfer paper is conveyed in the printer unit 2.

Accordingly, in step (3), it is determined if the operation of the printer unit 2 has been completed. For example, in the case of a jam in the original feeding device 101, the operation of the printer unit 2 is stopped after the sheet fed in the printer unit 2 has been discharged onto the sheet-discharging unit 208. If the result of the determination in step (3) is negative, the stoppage of the operation of the printer unit 2 is awaited. When the operation of the printer unit 2 has stopped, the state of the printer unit 2 is switched to an off-line state, and a display indicating the occurrence of the jam, such as "Remove the jammed sheet" or the like, is performed on the display unit 301 shown in FIG. 3 (step (4)). After the display of the jam, jam recovery processing for the printer unit 2 is performed, and it is determined if a printable state is provided based on opening/closing of the door, depressing of a dedicated switch, or the like (step (5)). If the result of the determination is affirmative, it is determined if the mode present when the jam has occurred is the synthesis mode (step (6)). If the result of the determination in step (6) is negative, the state of the printer unit 2 is switched to an on-line state, and the process proceeds to step (1) shown in FIG. 8, and the printing operation is resumed.

If the result of the determination in step (6) is affirmative, it is determined if the synthesis mode comprises a feeder mode (step (7)). If the result of the determination in step (7) is negative, the state of the printer unit 2 is switched to an on-line state because it is unnecessary to recover the original, and the process proceeds to step (1) shown in FIG. 10.

If the result of the determination in step (7) is affirmative, a display to urge the operator to return the original again to the sheet-feeding position (an original recovery display), such as, as shown in FIG. 14, "Return the original to the initial position and provide an on-line state", is performed on the display unit 301 (step (8)). Then, the operator waits until the state of the printer unit 2 becomes an on-line state (step (9)). When an on-line state has been provided, the original is fed to the reading position, and original recovery processing of switching the state of the printer to an on-line state is performed (step (10)), and the process returns to step (1) shown in FIG. 10.

Figure 16:
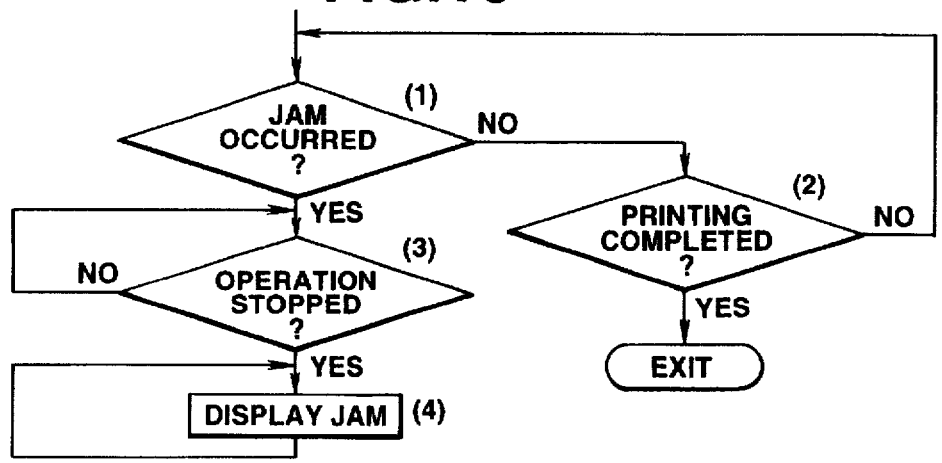
FIGS. 16 and 17 are flowcharts illustrating procedures of a third jam recovery processing procedure in the composite-image forming apparatus shown in FIG. 1.

Next, a description will be provided of another jam recovery operation with reference to the flowchart shown in FIG. 16.

FIG. 16 is a flowchart illustrating an example of a third jam recovery processing procedure in the composite-image forming apparatus shown in FIG. 1. In FIG. 16, numerals (1) through (4) represent respective steps. The processing comprises a subroutine called from a main sequence at every constant time period, or whenever necessary.

First, it is determined if a jam has occurred (step (1)). If the result of the determination is negative, it is determined if the printing operation (image forming operation) has been completed (step (2)). If the result of the determination in step (2) is affirmative, the process returns. If the result of the determination in step (2) is negative, the process returns to step (1).

If the result of the determination in step (1) is affirmative, the process proceeds to step (3).

In the present embodiment, a jam comprises a jam while an original is conveyed by the original feeding device 101 shown in FIG. 2, or a jam while a sheet of transfer paper is conveyed in the printer unit 2.

Accordingly, in step (3), it is determined if the operation of the printer unit 2 has been completed. For example, in the case of a jam in the original feeding device 101, the operation of the printer unit 2 is stopped after the sheet fed in the printer unit 2 has been discharged onto the sheet-discharging unit 208. If the result of the determination in step (3) is negative, the stoppage of the operation of the printer unit 2 is awaited. When the operation of the printer unit 2 has stopped, the state of the printer unit 2 is switched to an off-line state, and a display indicating the occurrence of the jam is performed on the display unit 301 shown in FIG. 3 (step (4)), so that other processing cannot be performed until the power supply is turned off.

In the present embodiment, before performing jam display and entering an infinite loop, information relating to the occurrence of the jam and other information necessary for recovery are, of course, stored in a backup area.

Figure 17:
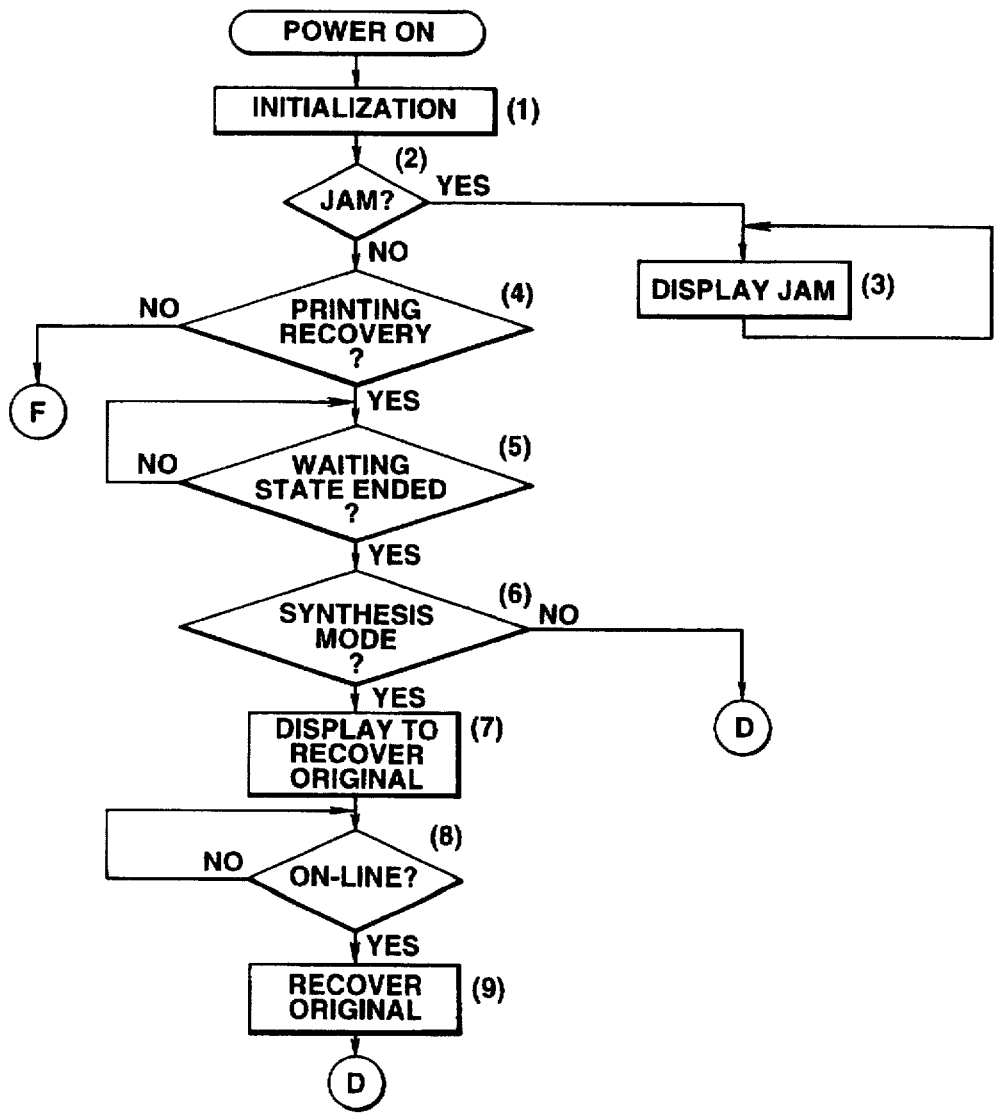

Next, a description will be provided of a recovery processing procedure when the power supply is turned on with reference to the flowchart shown in FIG. 17.

FIG. 17 is a flowchart illustrating a procedure of a third jam recovery processing in the composite-image forming apparatus shown in FIG. 1. In FIG. 17, numerals (1) through (9) represent respective steps. The processing comprises a subroutine called from a main sequence at every constant time period, or whenever necessary.

When the power supply has been turned on after the above-described turned-off state, initialization is performed for respective loads, a RAM (random access memory) and the like (step (1)). Then, it is determined if a jam has occurred (step (2)). If the result of the determination is affirmative, the jam is displayed (step (3)), and the process enters an infinite loop, and execution of other processing is restricted.

If the result of the determination in step (2) is negative, it is determined if printing recovery processing is to be performed (step (4)). If the result of the determination in step (4) is negative, the process proceeds to step (1) shown in FIG. 4 in order to execute ordinary processing to be performed when the power supply is turned on. If the result of the determination in step (4) is affirmative, it is awaited until a waiting state of the printing unit 2 ends (step (5)). When the waiting state of the printing unit 2 has ended, it is determined if the mode present when the jam has occurred is the synthesis mode (step (6)). If the result of the determination is negative, the process proceeds to step (1) shown in FIG. 8, and a printing operation is started.

If the result of the determination in step (6) is affirmative, a display to urge the operator to return the original, such as, as shown in FIG. 14, "Return the original to the initial position and provide an on-line state", is made on the display unit 301 (step (7)). Next, the operator awaits until the state of the printer unit 2 becomes an on-line state (step (8)). When an on-line state has been provided, the original is fed to the reading position (step (9)), and the process returns to step (1) shown in FIG. 10.

Next, a description will be provided of another embodiment of the present invention, which includes a memory for storing image data read by the reader unit 1, and which can form an image by the printer unit 2 by synthesizing images in the memory.

Figure 18:
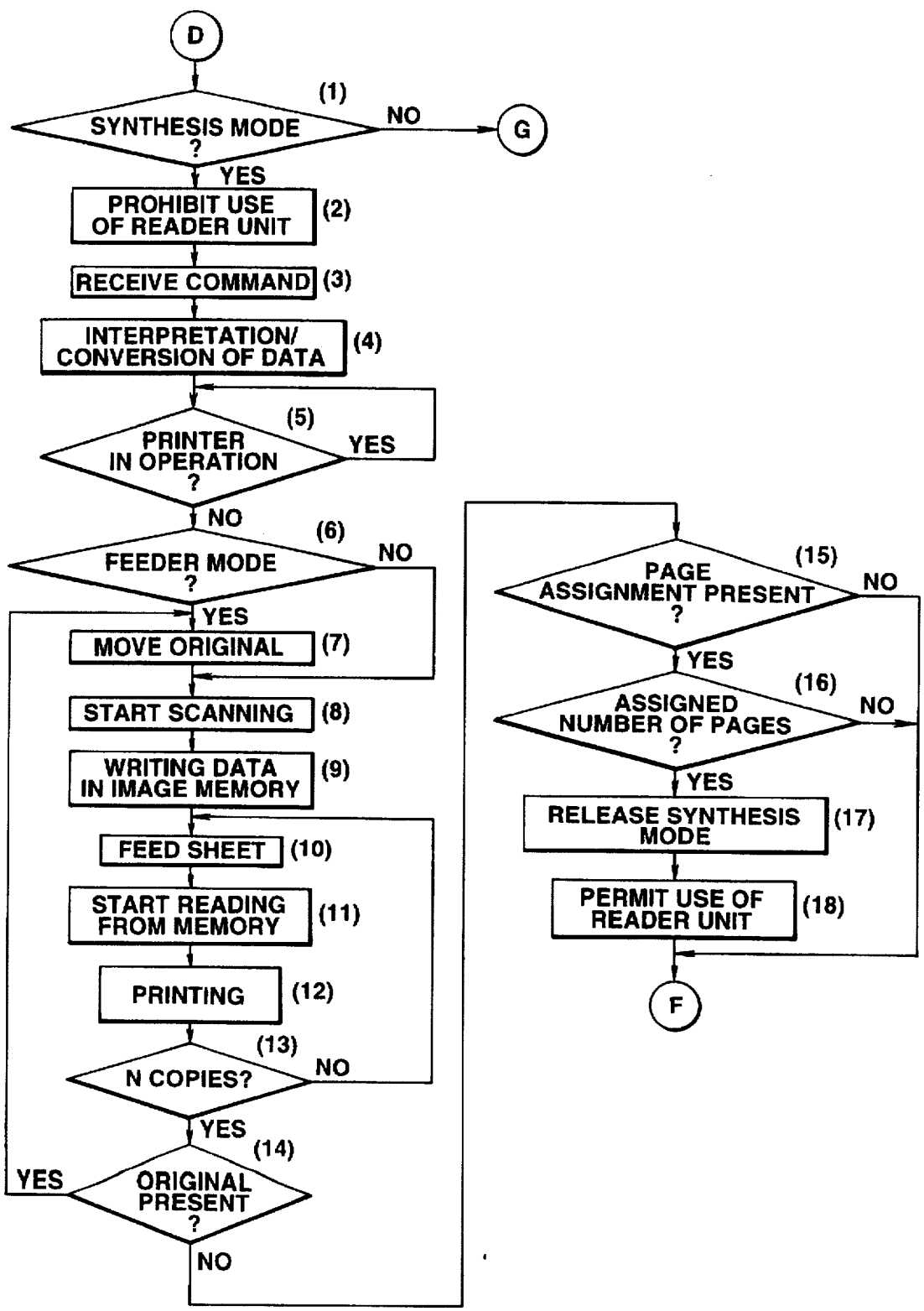
FIGS. 18 and 19 are flowcharts illustrating procedures of image synthesis processing according to other embodiments of the present invention.

FIG. 18 is a flowchart illustrating the image synthesis processing of the present embodiment. First, it is determined if the synthesis mode is set (step (1)). If the result of the determination is negative, the processing shown in FIG. 8 is started. If the result of the determination is affirmative, the synthesis sequence shown in FIG. 18 is started. First, a copying operation and the use of the reader unit 1 during facsimile transmission and file recording are prohibited (step (2)). This is for the purpose of preventing the target original from being replaced by an original used in a mode other than the synthesis mode while waiting for the transmission of image data obtained as a result of conversion by the formatter unit 8 after the synthesis mode has been set. As in the case of ordinary command conversion and output, the formatter unit 8 converts a command into image information, comprising, for example, characters (steps (3) and (4)). If the printer unit 2 is not in operation when the formatted image data is ready for being output as a result of determination step (5), a synthesis output operation is started. At that time, it is determined if the mode of reading the image of the original is a feeder mode (step (6)). If the result of the determination is affirmative, since the state of setting of the original is monitored by a sensor (not shown) provided in the original feeding device 101 shown in FIG. 2, the original is moved to a reading position when the original is set (step (7)). Then, the scanner unit 104 is moved (step (8)), and original-image data is received by the CCD 109. The read original-image data is written in a rewritable image memory without modifying the form of multivalue data (step (9)). The image memory can store image data for one sheet to a few sheets depending on the size of the image on the original. Then, a sheet of transfer paper is fed from an appropriate transfer-paper mounting unit (sheet cassette 204 or 205) (step (10)), and is moved to the transfer unit 206. At that time, image data is read from the image memory so that a latent image of the original is formed on the photosensitive member 202 at an appropriate timing (step (11)). The image-data signal read from the image memory and the image signal formed by the formatter unit 8 are transmitted to an exposure control unit 201 alternatively according to the asigned region by being switched by a switching circuit, and printing is performed (step (12)). The printing operation is the same as the above-described operation, and therefore a description thereof will be omitted.

Then, it is determined if a plurality of copies (N copies in the case of FIG. 18) of the same image have been printed (step (13)). If the result of the determination is negative, the sheet-feeding operation in step (10) is performed again. By repeating the above-described sequence, a plurality of copies of the same image can be printed.

Next, a description will be provided of a case in which image data of a plurality of originals are synthesized with image data from the outside with reference to the flowchart shown in FIG. 18, although partly overlapped with the foregoing description.

After N copies of a composite image of the first original have been printed (step (13)), the original feeding device 101 determines if the next original is present (step (14)). If the result of the determination is negative, the process proceeds from the above-described process sequence. If the result of the determination is affirmative, the original is replaced (step (7)), and the scanning of the original image in step (8) and the writing of image data in the image memory in step (9) are performed. By repeating the above-described process sequence, a plurality of original-image data can be synthesized with single image data from the outside.

As described above, in the synthesis mode, other operations which use the reader unit 1 are prohibited. Accordingly, when the synthesis of image data of a required number of originals has been completed, it is desirable to permit other operations by releasing the synthesis mode.

Also in the first embodiment (FIG. 10) in which an image memory is not used, a plurality of copies of the same image can be output in the same sequence as in the present embodiment.

Figure 19:
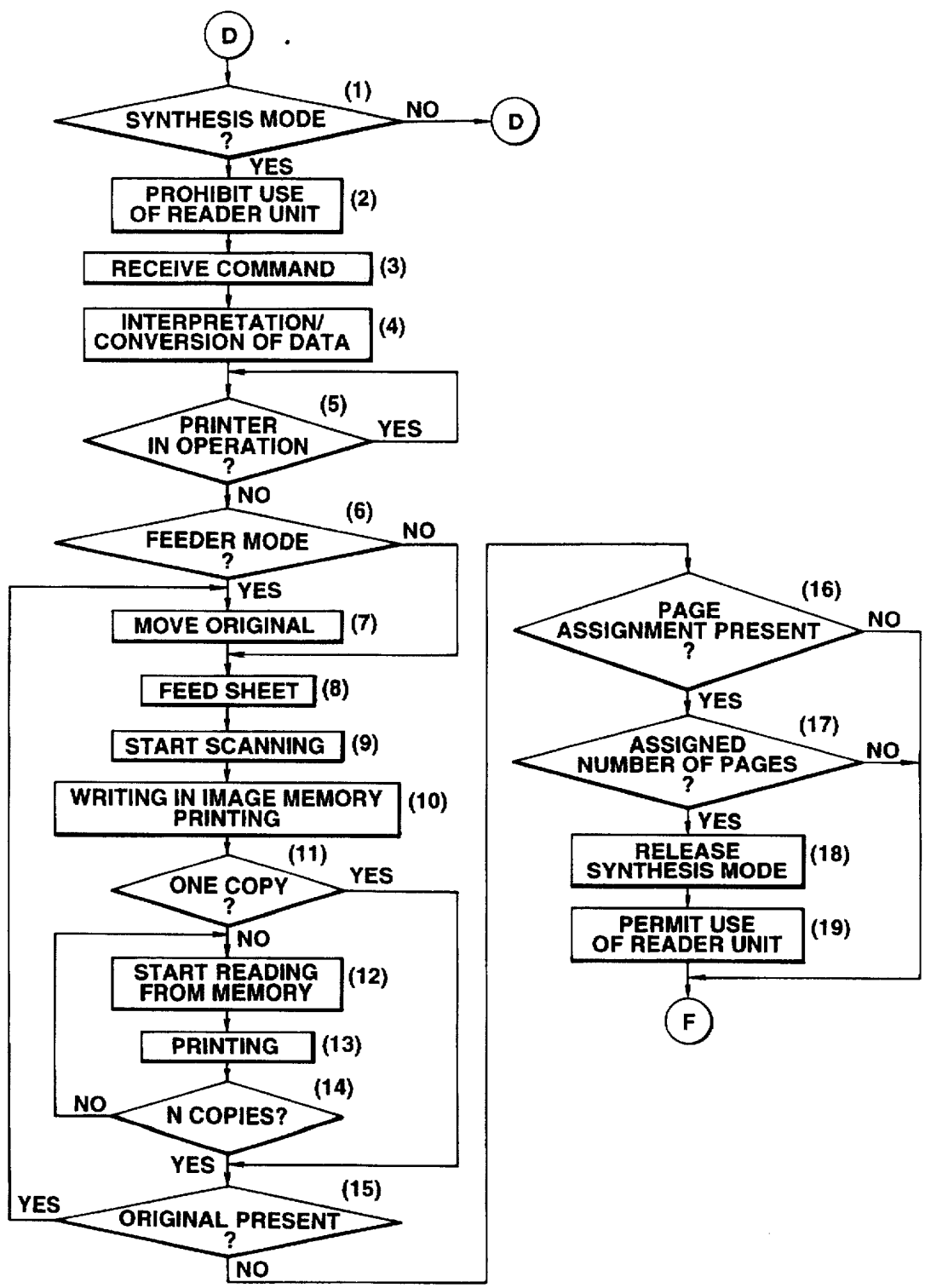

FIG. 19 shows an example of a synthesis sequence in which an image memory is also used.

The flowchart shown in FIG. 19 is a sequence in which writing of image data in the image memory and printing of the first sheet are simultaneously performed.

The sequence until step (7) is the same as the sequence shown in FIG. 18. Then, a sheet of transfer paper is fed from an appropriate sheet cassette (204 or 205), and is moved to the transfer unit 206. At that time, the scanner unit 104 is moved so that a latent image of the original is formed on the photosensitive member 202 at an appropriate timing (step (9)), and original-image data is received by the CCD 109. The obtained image-data signal and the image signal formed by the formatter unit 8 are transmitted to an exposure control unit 201 alternatively according to the asigned region by being switched by a switching circuit, and printing and writing in the image memory are performed (step (10)). The printing operation is the same as the above-described operation.

Then, it is determined if a plurality of copies of the same image must be printed (step 11)). When only one copy is needed, the presence of the next original is determined (step (15)). When a plurality of copies (N copies) are needed, image data is read from the image memory, and printing is performed in the above-described manner. At that time, a sheet is fed from an appropriated sheet cassette, and the image data is read with an appropriate timing. Then, it is determined if N copies have been printed. If the result of the determination is negative, the process returns again to step (12), and the sequence is repeated. If the result of the determination in step (12) is affirmative, the original feeding device 101 determines if the next original is present. If the result of the determination is negative, the process proceeds from the above-described process sequence. If the result of the determination is affirmative, the original is replaced, and the process returns to step (7). By repeating the above-described process sequence, a plurality of original-image data can be synthesized with single image data from the outside.

Figure 20:
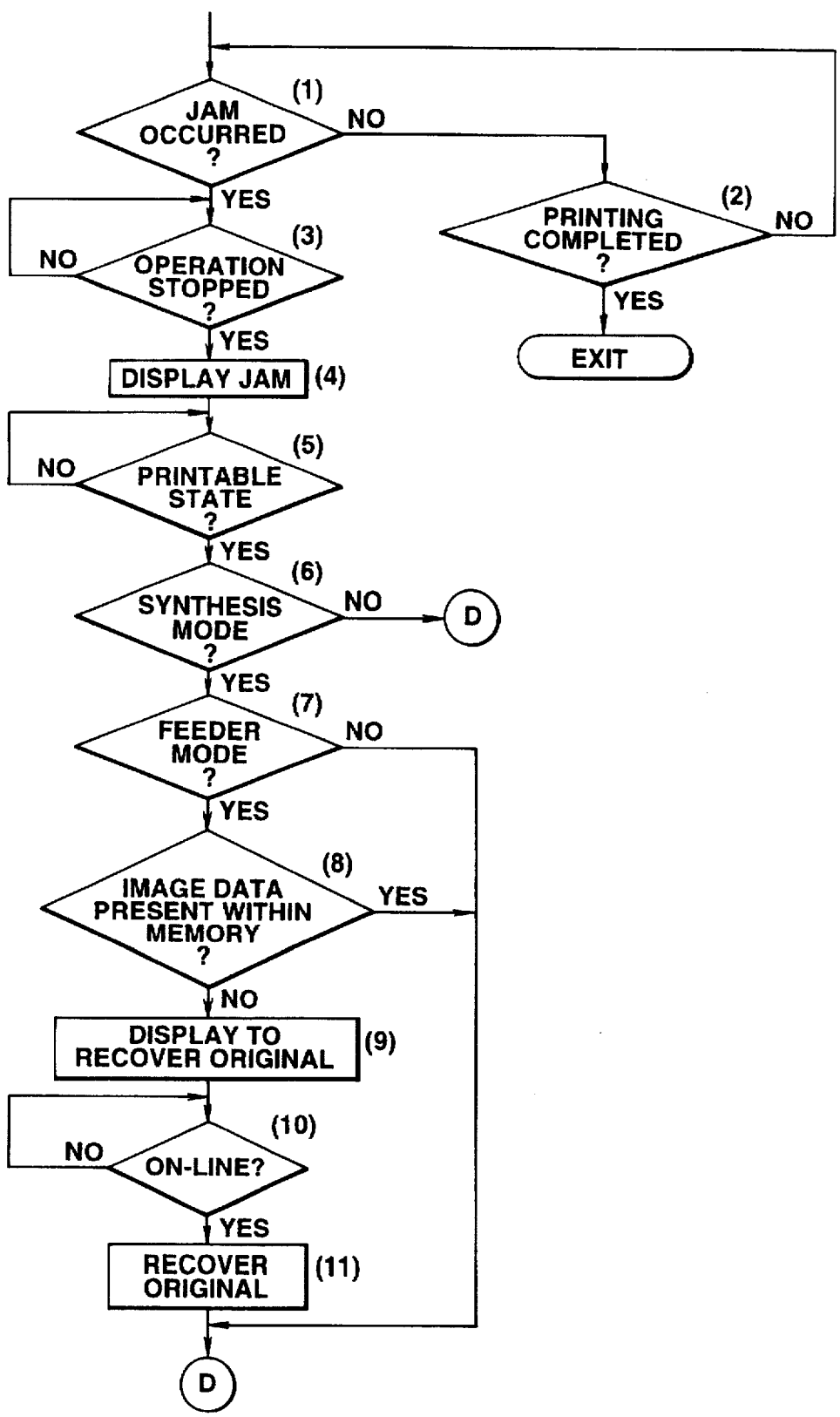
FIG. 20 is a flowchart illustrating a procedure of a fourth jam recovery processing in the composite-image forming apparatus shown in FIG. 1.

FIG. 20 is a flowchart illustrating a procedure of jam recovery processing of the present embodiment. The processing comprises a subroutine called from a main sequence at every constant time period, or whenever necessary.

First, it is determined if a jam has occurred (step (1)). If the result of the determination is negative, it is determined if the printing operation (image forming operation) has been completed (step (2)). If the result of the determination in step (2) is affirmative, the process is terminated. If the result of the detemination in step (2) is negative, the process returns to step (1). If the result of the determination in step (1) is affirmative, the process proceeds to step (3). In the present embodiment, a jam comprises a jam while an original is conveyed by the original feeding device 101 shown in FIG. 2, or a jam while a sheet of transfer paper is conveyed in the printer unit 2.

Accordingly, in step (3), it is determined if the operation of the printer unit 2 has been completed. For example, in the case of a jam in the original feeding device 101, the operation of the printer unit 2 is stopped after the sheet fed in the printer unit 2 has been discharged onto the sheet-discharging unit 208. If the result of the determination in step (3) is negative, the stoppage of the operation of the printer unit 2 is awaited. When the operation of the printer unit 2 has stopped, the state of the printer unit 2 is switched to an off-line state, and a display indicating the occurrence of the jam is performed on the display unit 301 shown in FIG. 3 (step (4)). After the display of the jam, jam recovery processing for the printer unit 2 is performed. If a printable state is provided, it is determined if the mode present when the jam has occurred is the synthesis mode (step (6)). If the result of the determination in step (6) is negative, the state of the printer unit 2 is switched to an on-line state, and the process proceeds to step (1) shown in FIG. 8, and the printing operation is resumed.

If the result of the determination in step (6) is affirmative, it is determined if the synthesis mode comprises a feeder mode (step (7)). If the result of the determination in step (7) is negative, the state of the printer unit 2 is switched to an on-line state because it is unnecessary to recover the original, and the process proceeds to step (1) shown in FIG. 10.

If the result of the determination in step (7) is affirmative, it is determined if image data, for which the synthesis is to be resumed, is present within the image memory (step (8)). If the result of the determination is affirmative, the state of the printer unit 2 is switched to an on-line state because it is unnecessary to recover the original as in the case of the negative result of the determination in step (7), and the process proceeds to step (1) shown in FIG. 10.

If the result of the determination in step (8) is negative, a display to urge the operator to return the original again to the sheet-feeding position (an original recovery display), such as, as shown in FIG. 14, "Return the original to the initial position and provide an on-line state", is performed on the display unit 301 (step (9)). Then, the operator awaits until the state of the printer unit 2 becomes an on-line state (step (10)). When an on-line state has been provided, the original is fed to the reading position, and original recovery processing of switching the state of the printer to an on-line state is performed (step (11)), and the process returns to step (1) shown in FIG. 10.

As described above, when it has been determined that original-image data is preserved, or the state of the original is preserved as in the case of a mode other than the feeder mode and therefore a printing operation can be immediately resumed, the operation is immediately started.

Although in the present embodiment a description has been provided of an image memory capable of storing image data for one original to a few originals, the present invention may, of course, be applied to a case in which the image memory can store a greater amount of image data.

Next, a description will be provided of operation procedures during scanner synthesis in the composite-image forming apparatus of the present invention with reference to FIGS. 21 through 30.

FIGS. 21 through 30 are diagrams illustrating operation procedures during scanner synthesis in the composite-image forming apparatus of the present invention. The operation unit comprises keys K1–K5, and a touch-panel-type display DSP. By touching one of key areas displayed on the display DSP, an operation is instructed.

Figure 21:
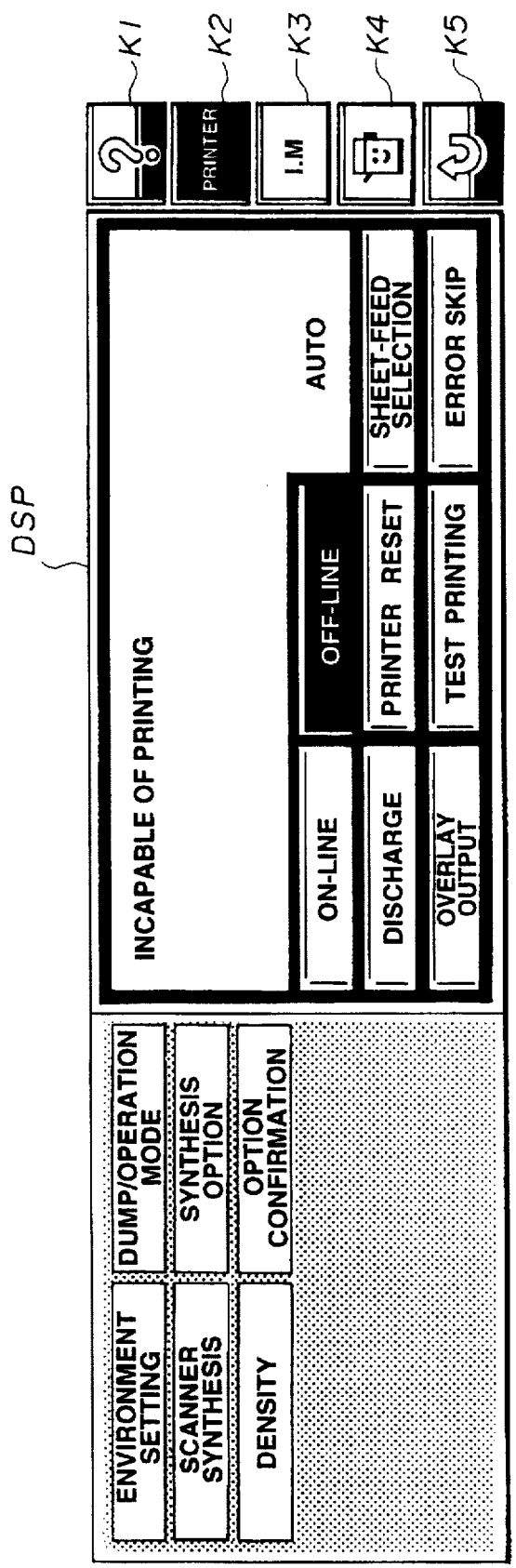
FIGS. 21 through 47 are diagrams illustrating examples of the picture surface of a display DSP on the operation panel in the composite-image forming apparatus shown in FIG. 1.

First, as shown in FIG. 21, a key area "off-line" is depressed, whereby the area is displayed in a density-reversal state. The printer thereby assumes an off-line state. Thereafter, a key area "scanner synthesis" is depressed, whereby the display picture surface of the display DSP is switched to the picture surface shown in FIG. 22, and the key area "scanner synthesis" is displayed in a density-reversal state.

Figure 23:
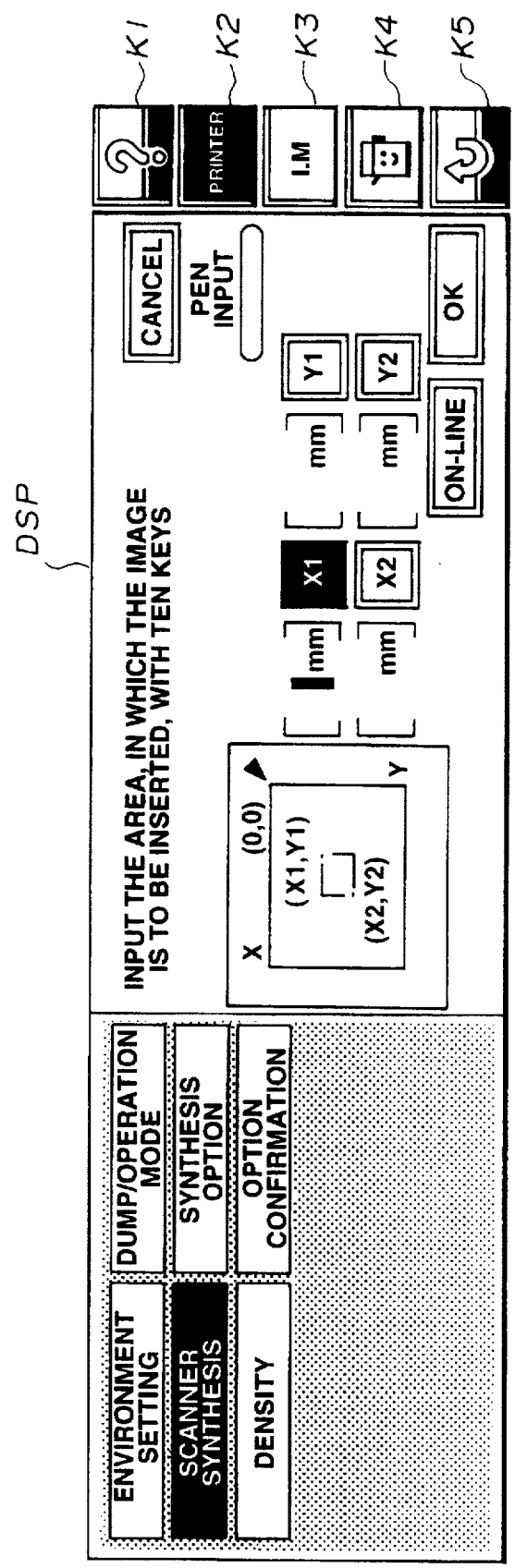

Thereafter, the numerical values of the area, in which the image is to be inserted, are input by performing a pen input operation for two points using an editor pen which can be optionally connected, or by displaying the picture surface shown in FIG. 23 on the display DSP and performing a ten-key input operation on the operation unit.

Figure 22:
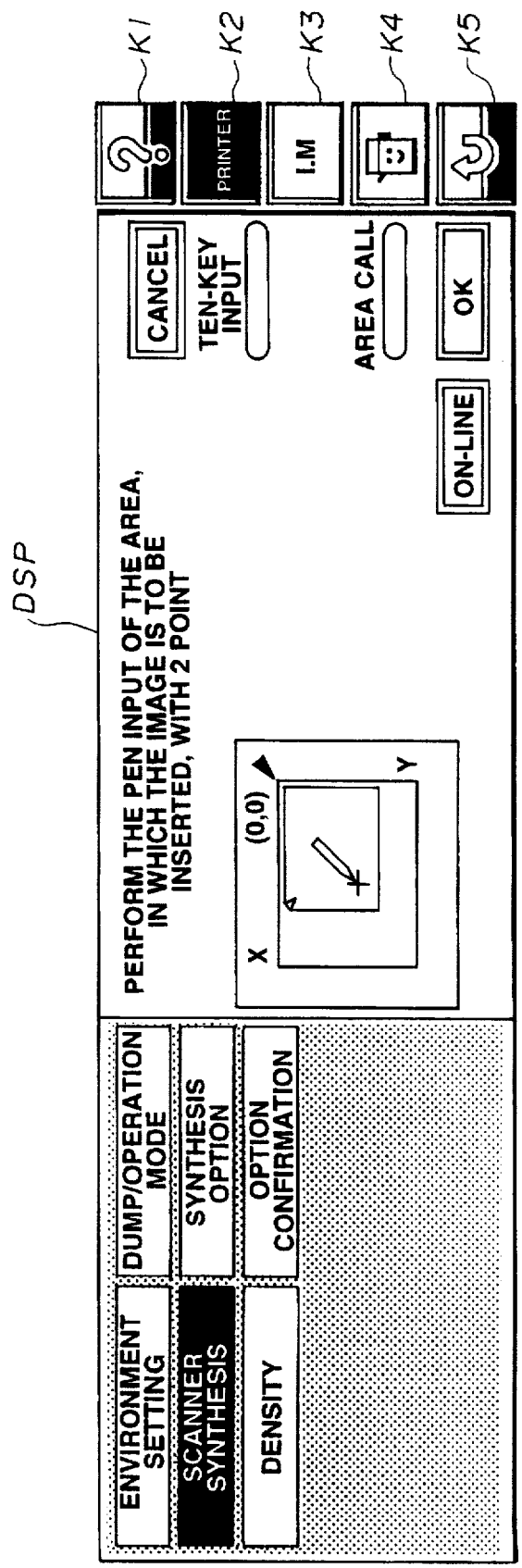
Figure 24:
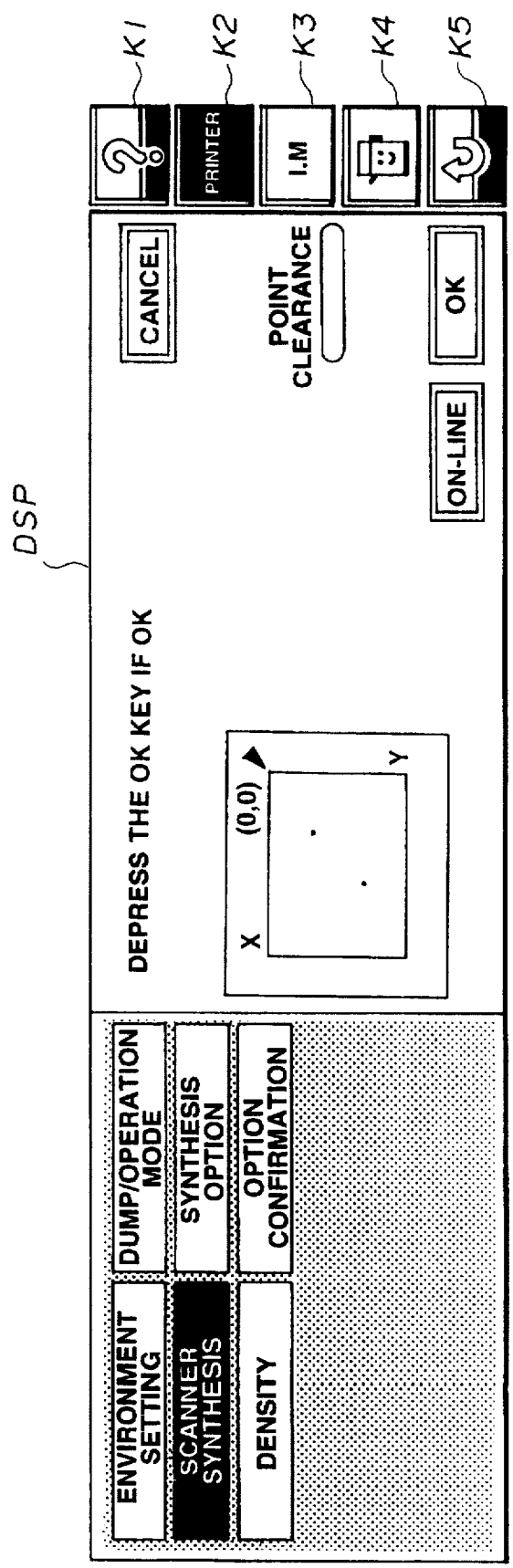

When the coordinates of the two points have been input in FIGS. 22 and 23, the input two points are displayed on the picture surface, as shown in FIG. 24. If a key area "point clearance" is depressed on the display picture surface, the display picture surface of the display DSP is switched to the picture surface shown in FIG. 22, and two points of the area in which the image is to be inserted are again input. In the present embodiment, the assigned two points are sequentially cleared.

Figure 26:
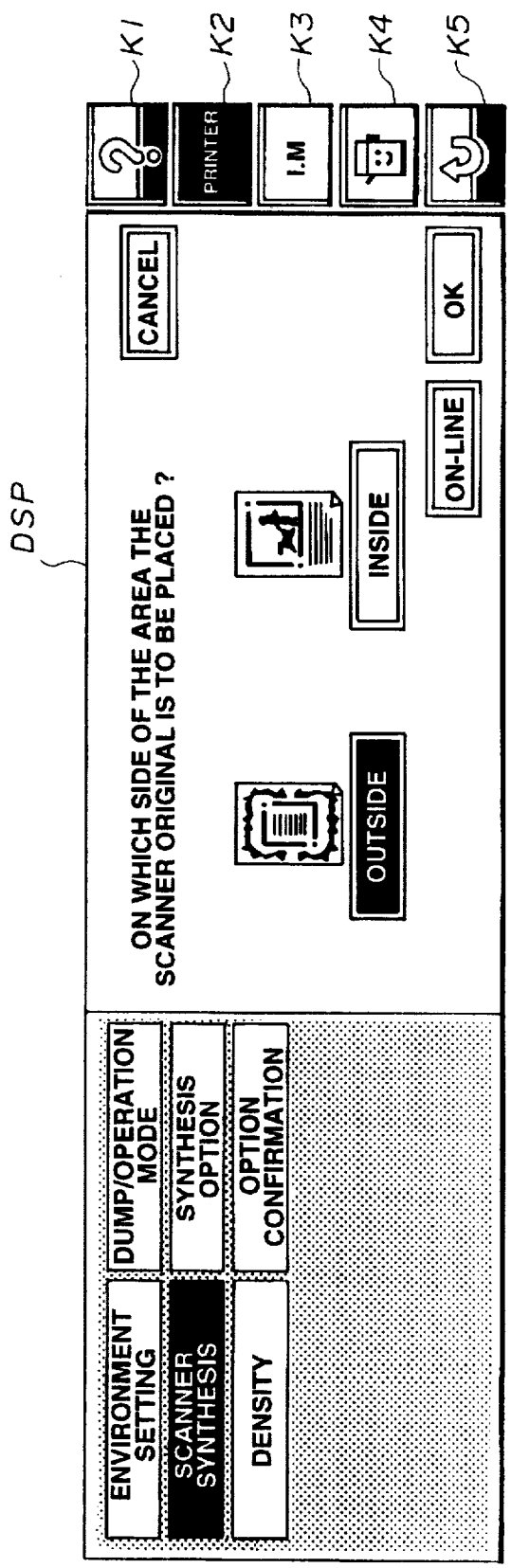

On the other hand, if a key area "OK" is depressed on the picture surface shown FIG. 24, the display picture surface of the display DSP is switched to the picture surface shown in FIG. 26, and whether the scanner original is to be synthesized inside or outside the area, in which the image is to be inserted, is assigned. In the present embodiment, the "outside" displayed in a density-reversal state corresponds to the selected state.

Figure 25:
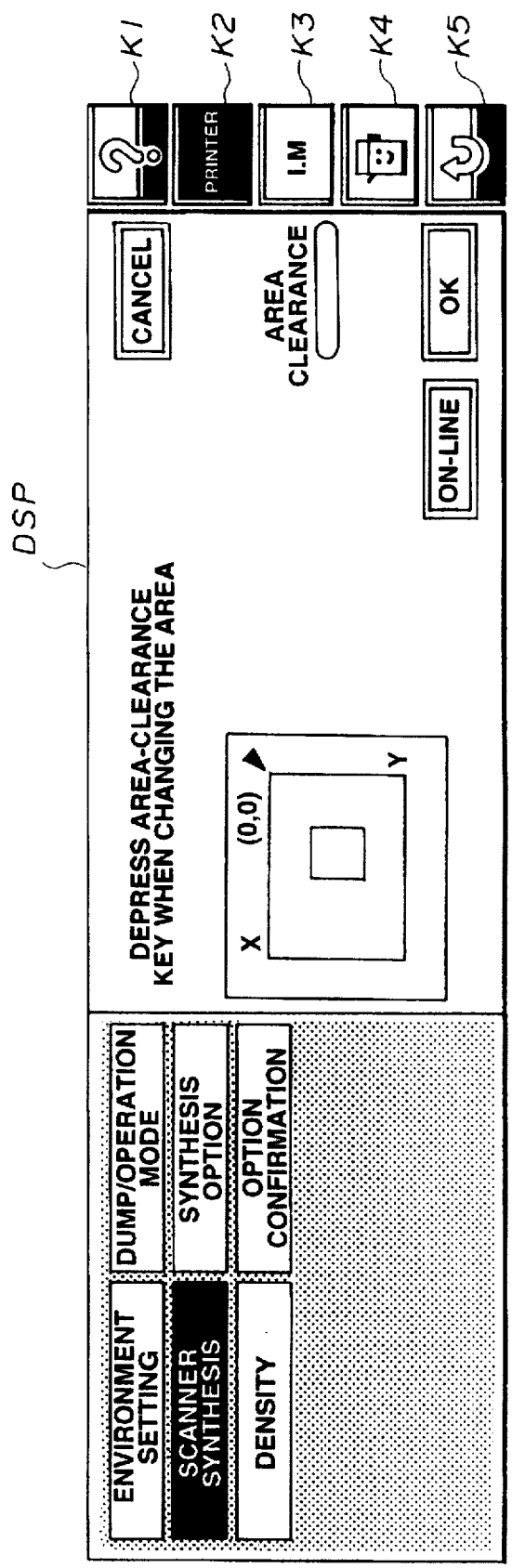

If a key area "cancel" is depressed on the picture surface shown in FIG. 26, the display picture surface of the display DSP is switched to the picture surface shown in FIG. 25, so that area change can be displayed. If a key area "area clearance" is then depressed, the display picture surface of the display DSP is switched to the picture surface shown in FIGS. 21 and 22, and area reassignment is performed. If the key area "cancel" is depressed on the picture surface shown in FIG. 25, the contents of display are switched to the picture surface shown in FIG. 21.

If the key area "OK" is depressed on the picture surface shown in FIG. 25, the display picture surface of the display DSP is switched again to the picture surface shown in FIG. 26. If the key area "OK" is depressed on the picture surface shown in FIG. 26, the display picture surface of the display DSP is switched to the picture surface shown in FIG. 27, and the number of pages (an arbitrary number between 1 and 999) of print data is input using ten keys. If the key area "OK" is depressed on the picture surface shown in FIG. 27, the display picture surface of the display DSP is switched to the picture surface shown in FIG. 28. If the key area "scanner synthesis" is depressed on the picture surface shown in FIG. 28, the display picture surface of the display DSP is switched to the picture surface shown in FIG. 25.

Figure 27:
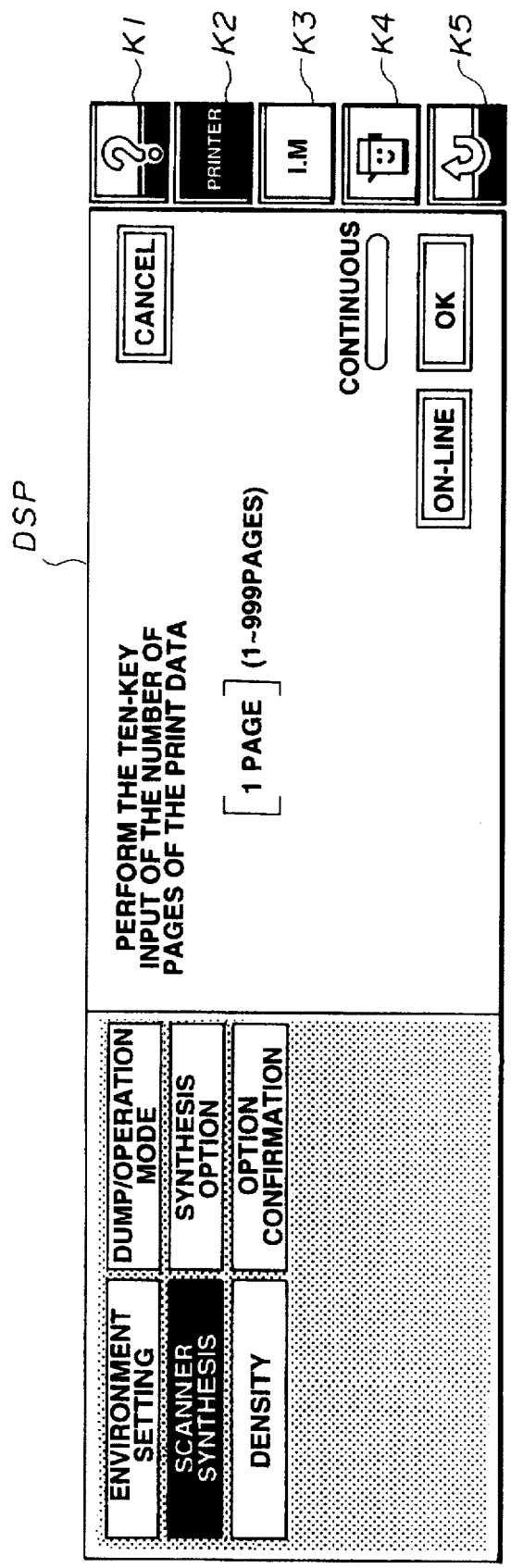
Figure 28:
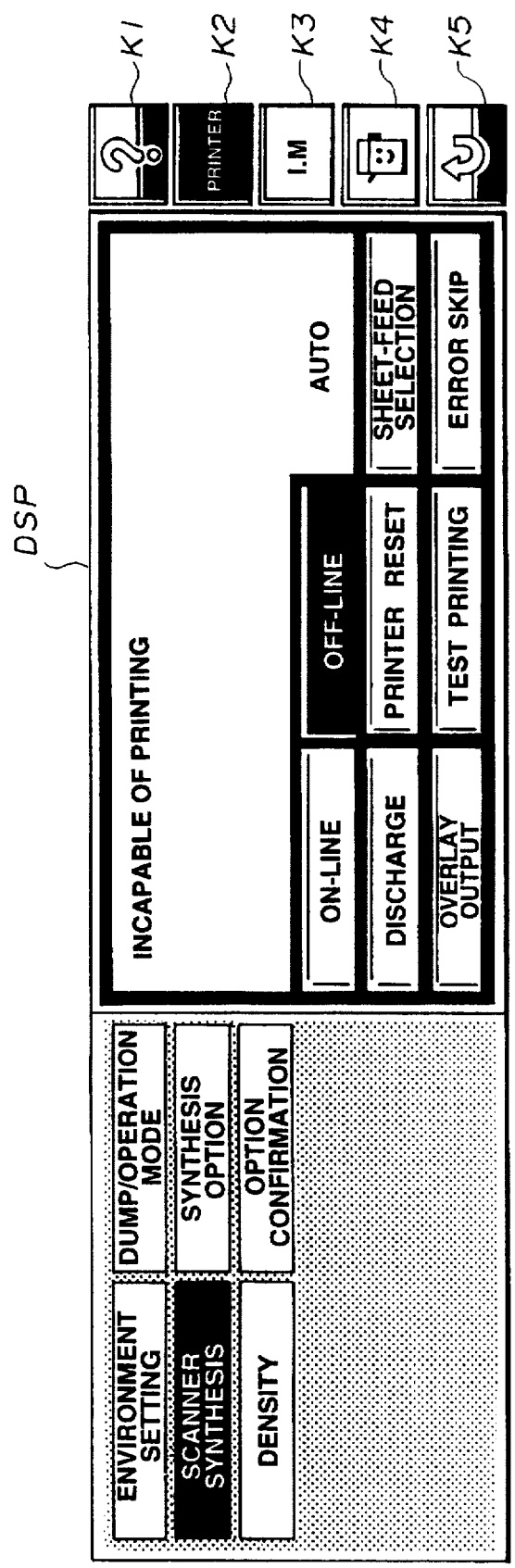
Figure 29:
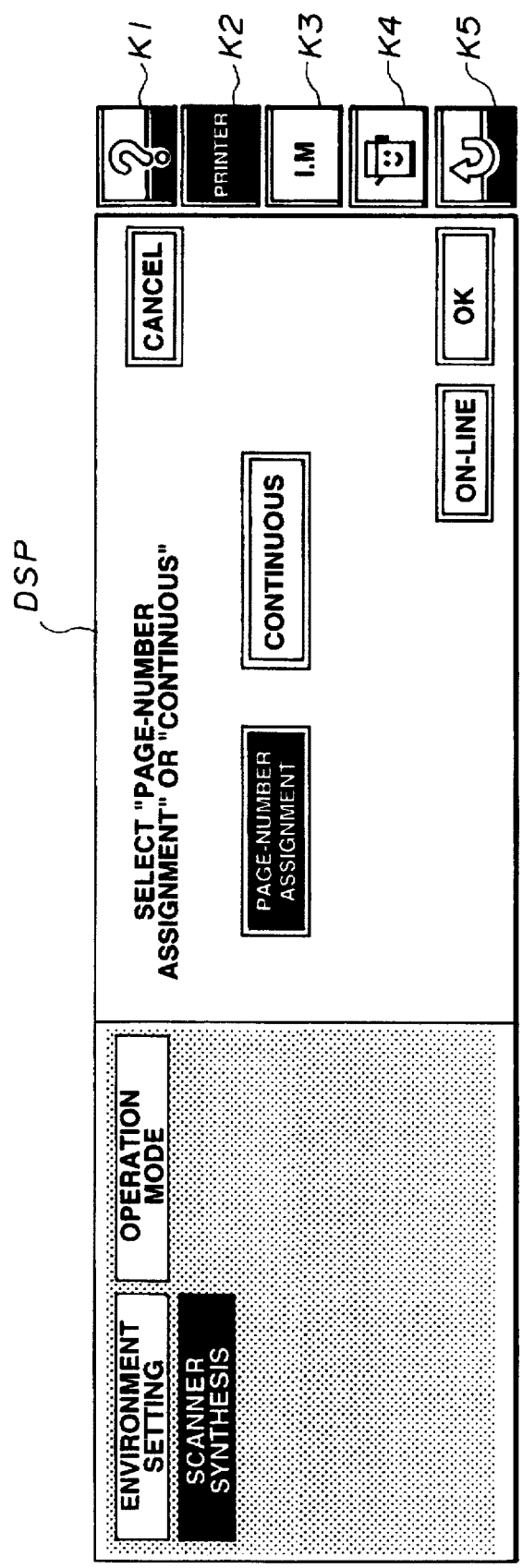
Figure 30:
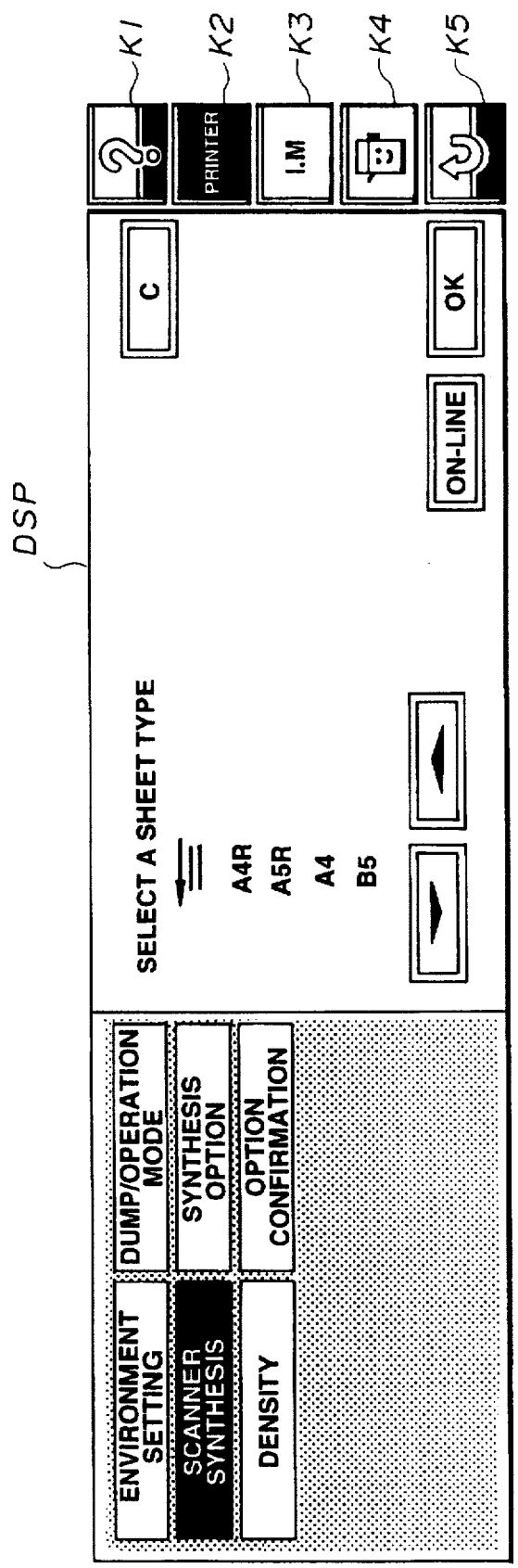

On the other hand, if a key area "continuous" is depressed on the picture surface shown in FIG. 27, the display picture surface of the display DSP is switched to the picture surface shown in FIG. 29, and whether the original to be subjected to scanner synthesis corresponds to "page-number assignment" or "continuous" is assigned. If the key areas "continuous" and "OK" are depressed on the picture surface shown in FIG. 29, the display picture surface of the display DSP is switched to the picture surface shown in FIG. 28. If the key areas "page-number assignment", and "OK" or "cancel" are depressed on the picture surface shown in FIG. 29, the display picture surface of the display DSP is switched to the picture surface shown in FIG. 27. After the operation of setting scanner synthesis has been completed, a picture surface for selecting a sheet type (see FIG. 30) is displayed on the display DSP of the operation unit.

Figure 31:
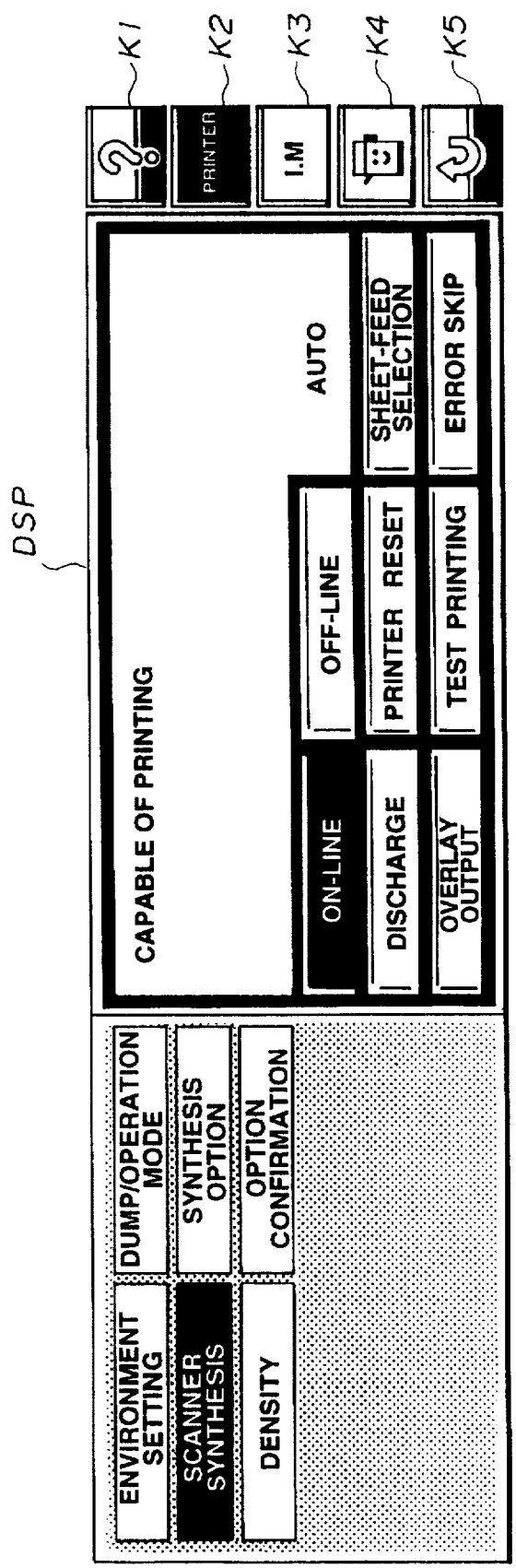
Figure 32:
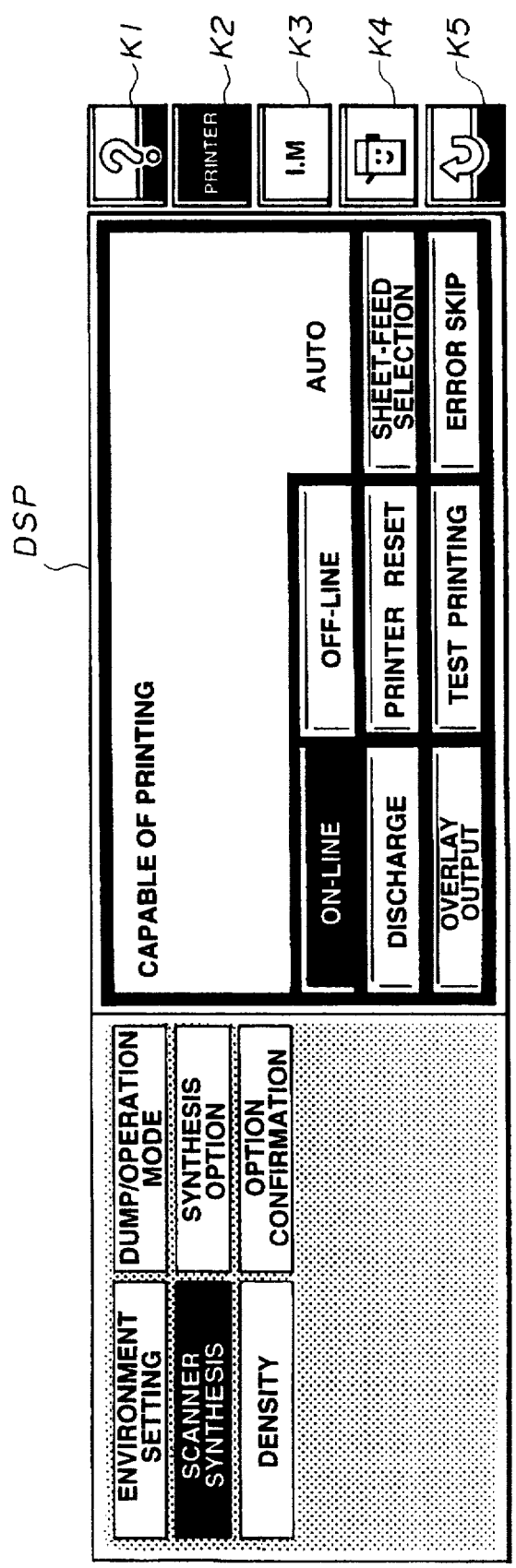

FIGS. 31 and 32 are diagrams showing examples of picture surfaces in which scanner synthesis is awaited in the composite-image forming apparatus of the present invention.

When the scanner original is set inside the assigned area, the picture surface shown in FIG. 31 is displayed on the display DSP while scanner synthesis is awaited. When the scanner original is set outside the assigned area, the picture surface shown in FIG. 32 is displayed on the display DSP while scanner synthesis is awaited.

Figure 33:
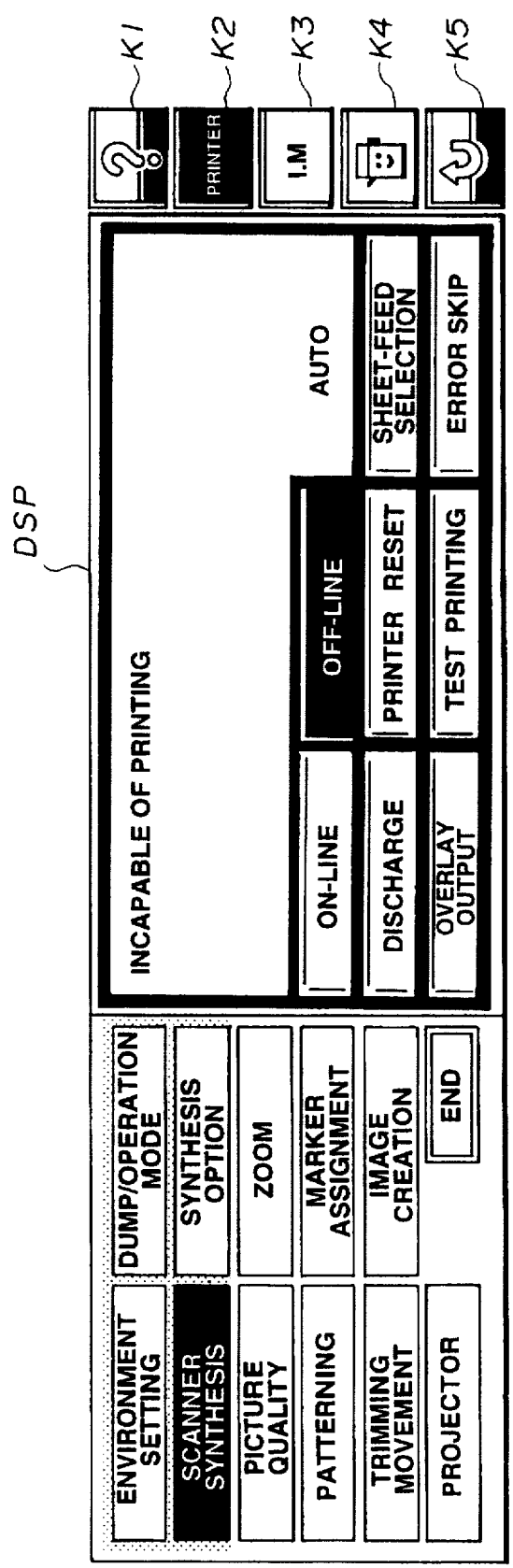
Figure 34:
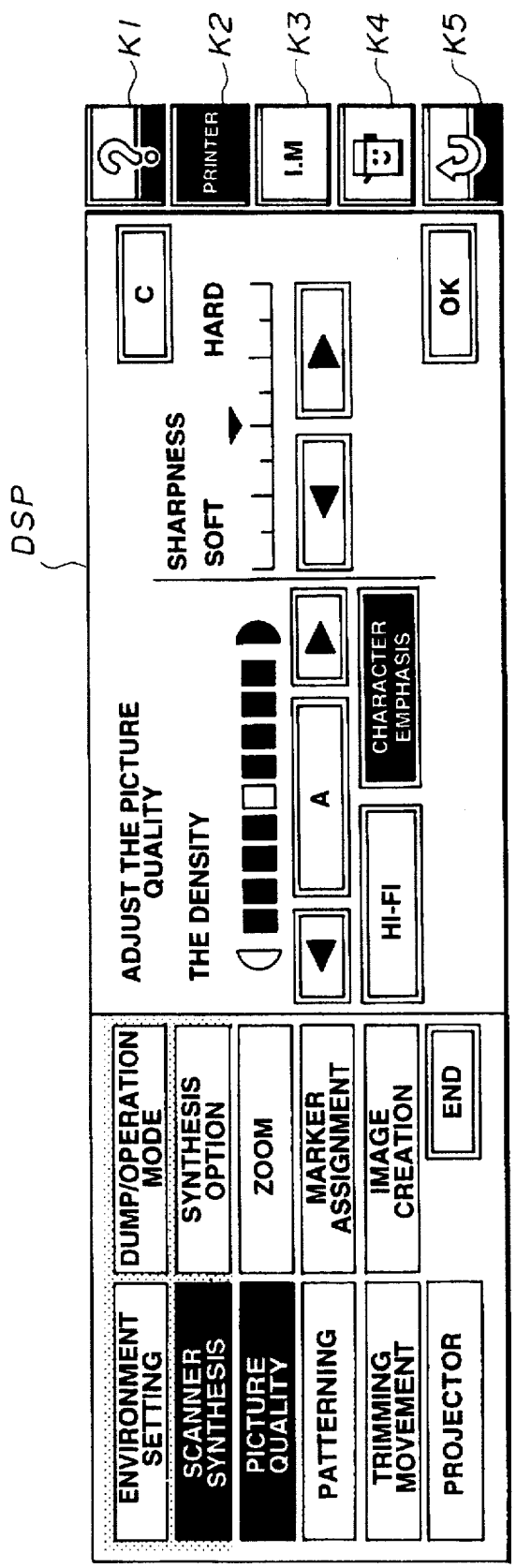

FIGS. 33 and 34 are diagrams showing examples of picture surfaces for setting options in scanner synthesis in the composite-image forming apparatus of the present invention, and correspond to picture surfaces for operations of setting picture quality.

If a key area "picture quality" is depressed in a state in which the picture surface shown in FIG. 33 is displayed on the display DSP, i.e., the key area "scanner synthesis" is displayed in a density-reversal state, the display picture surface of the display DSP is switched to the picture surface shown in FIG. 34, so that density (HI-FI/character emphasis), sharpness, and the like can be assigned. That is, it is possible to adjust the print density or emphasize a black-and-white image in accordance with the kind of an original, such as a character original, a photograph original or the like. If the key area "OK" or a key area "C" is depressed in the state of the picture surface shown in FIG. 34, the display picture surface of the display DSP is switched to the picture surface shown in FIG. 33, so that setting can be performed again.

Figure 35:
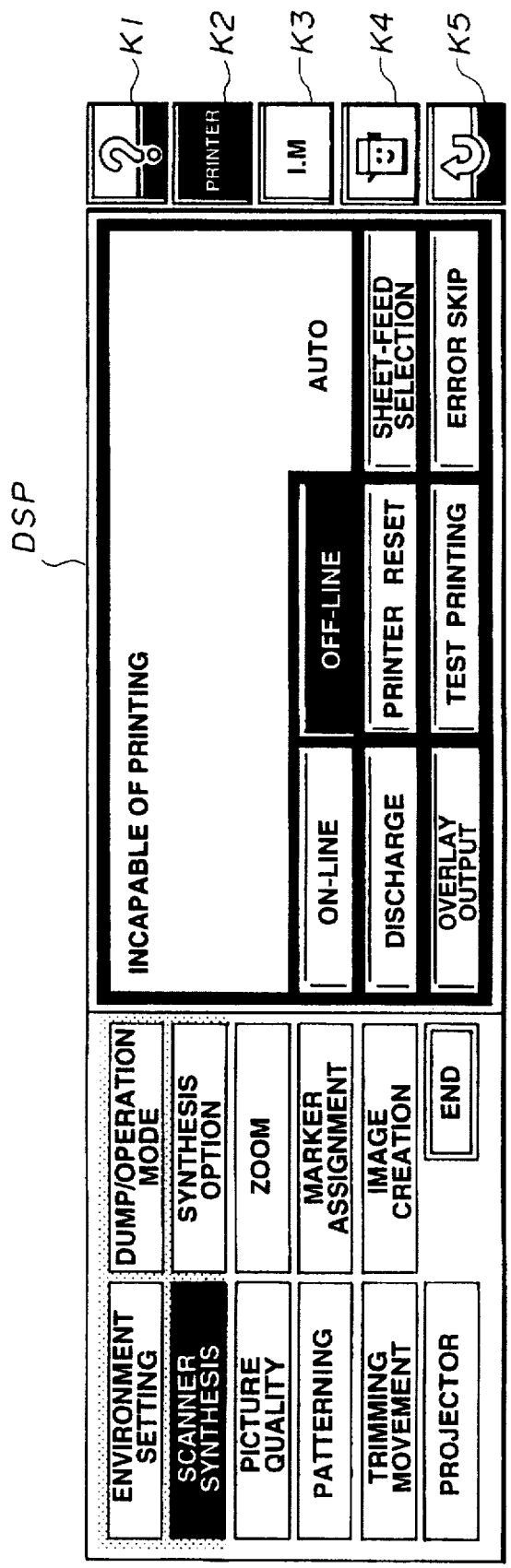
Figure 36:
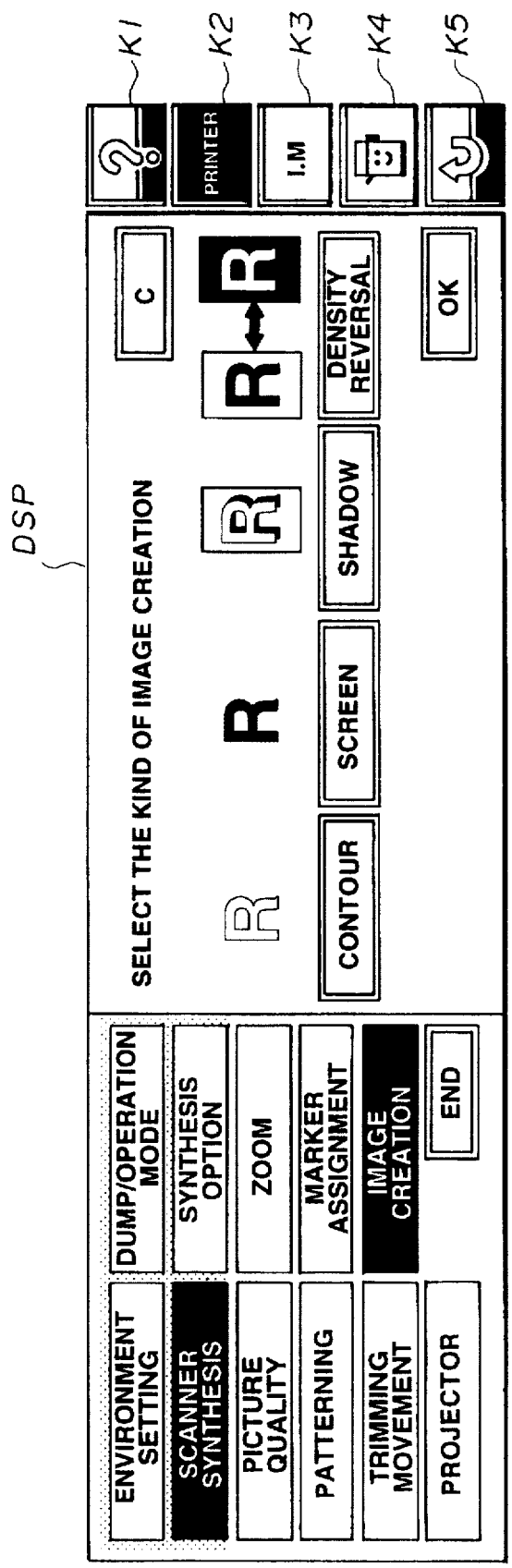

FIGS. 35 and 36 are diagrams showing examples of picture surfaces for setting options in scanner synthesis in the composite-image forming apparatus of the present invention, and correspond to picture surfaces for operations of setting image creation.

If a key area "image creation" is depressed in a state in which the picture surface shown in FIG. 35 is displayed on the display DSP, i.e., the key area "scanner synthesis" is displayed in a density-reversal state, the display picture surface of the display DSP is switched to the picture surface shown in FIG. 36, so that various kinds of image creating processing corresponding to respective key areas, "contour", "screen", "shadow", and "density reversal" can be set. If the key area "OK" or the key area "C" is depressed in the state of the picture surface shown in FIG. 36, the display picture surface of the display DSP is switched to the picture surface shown in FIG. 35, so that setting can be performed again.

FIGS. 37 through 42 are diagrams showing examples of picture surfaces for setting options in scanner synthesis in the composite-image forming apparatus of the present invention, and correspond to picture surfaces for operations of setting trimming movement.

Figure 37:
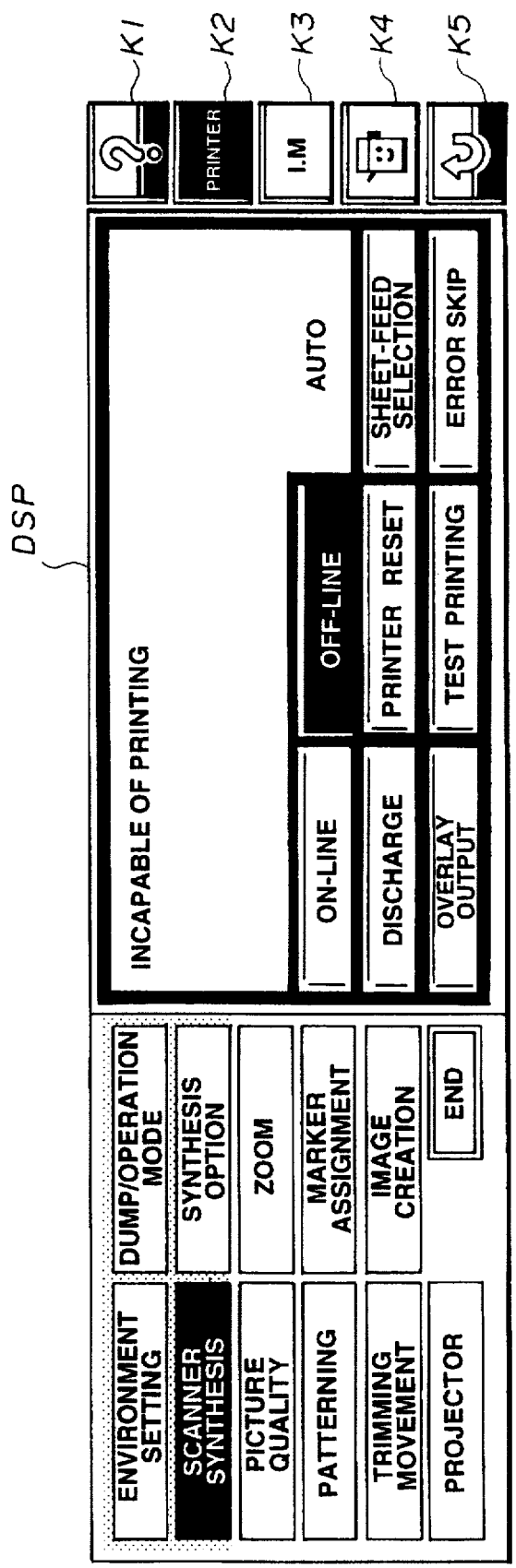
Figure 38:
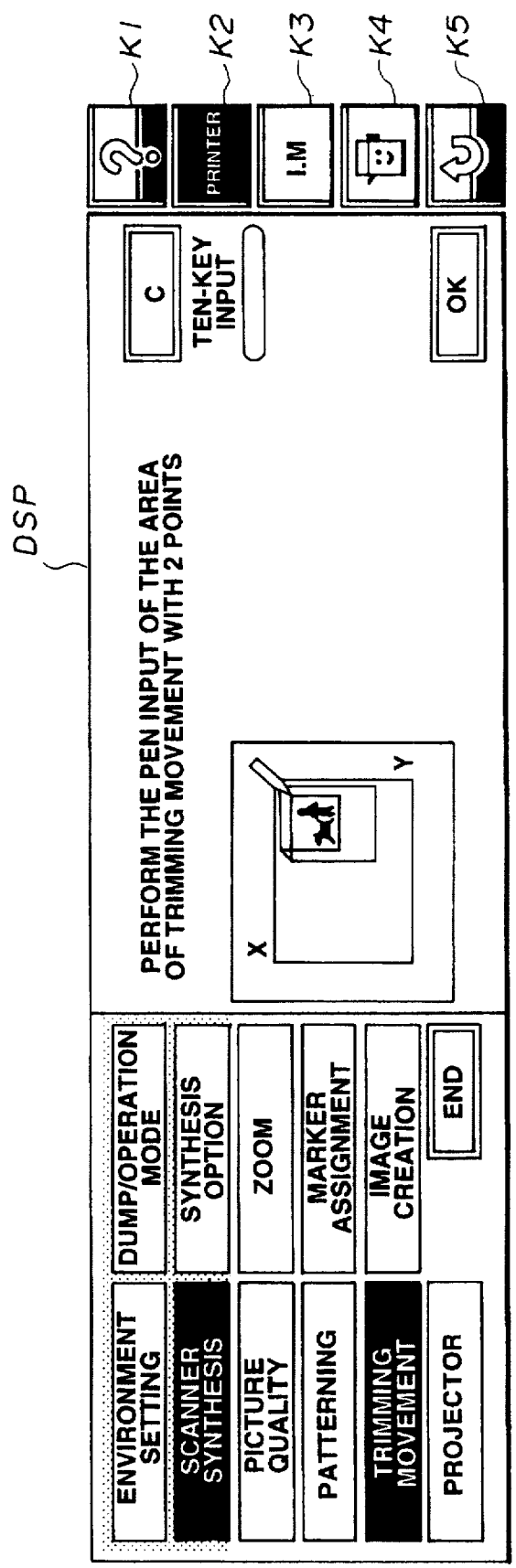

If a key area "trimming movement" is depressed in a state in which the picture surface shown in FIG. 37 is displayed on the display DSP, i.e., the key area "scanner synthesis" is displayed in a density-reversal state, the display picture surface of the display DSP is switched to the picture surface shown in FIG. 38, so that the key area "trimming movement" is displayed in a density-reversal state.

Figure 39:
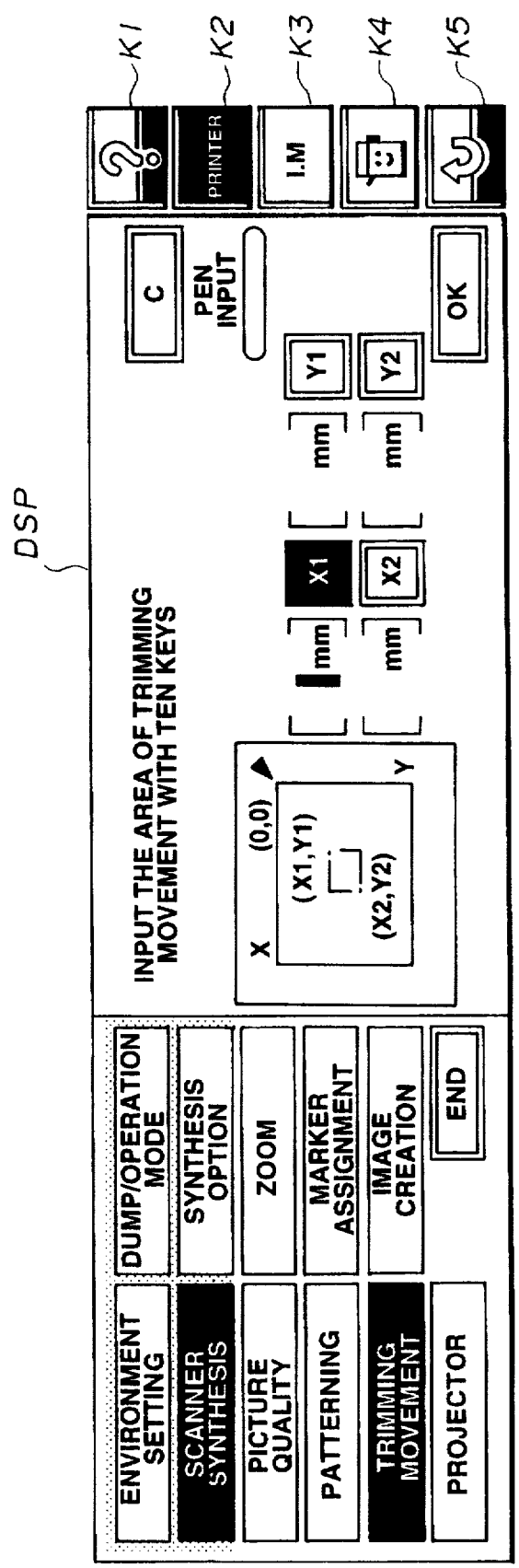

Thereafter, the numerical values of the area, in which the image is to be inserted, are input by performing a pen input operation for two points using an editor pen which can be optionally connected, or by displaying the picture surface shown in FIG. 39 on the display DSP and performing a ten-key input operation of the operation unit.

Figure 40:
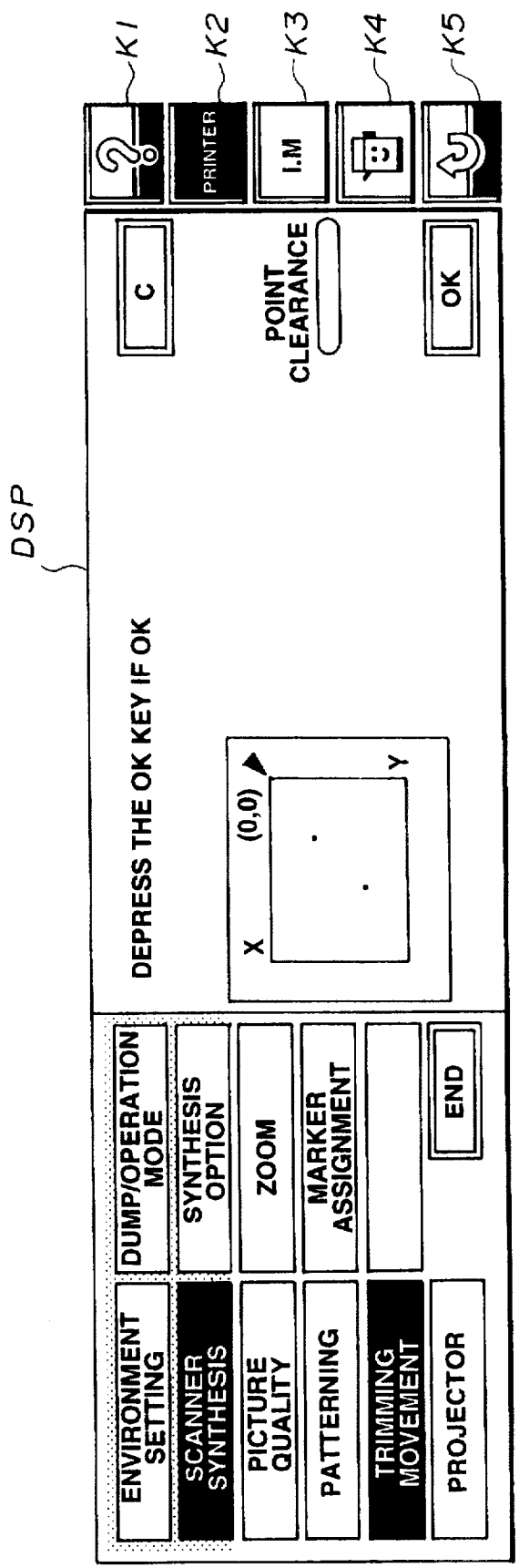
Figure 41:
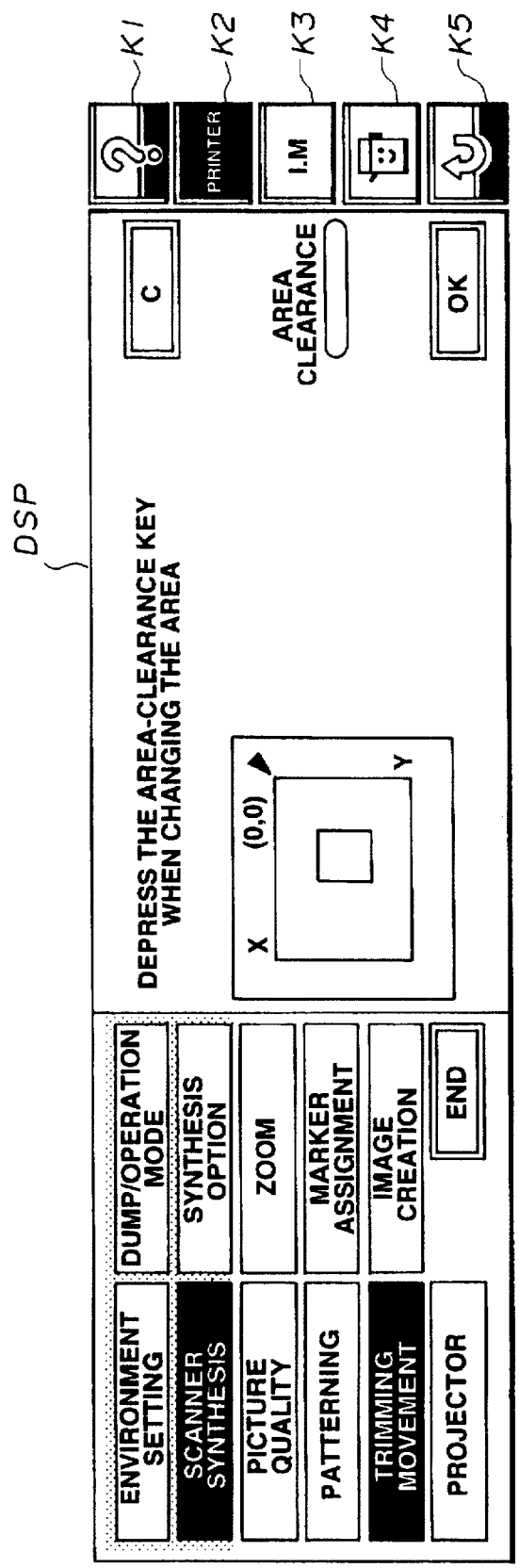

When the coordinates of two points have been input in FIGS. 38 and 39, the input two points are displayed on the picture surface, as shown in FIG. 40. If the key area "point clearance" is depressed on the display picture surface, the display picture surface of the display DSP is switched to the picture surface shown in FIG. 38, and two points of the area in which the image is to be inserted are again input. In the present embodiment, the assigned two points are sequentially cleared.

Figure 42:
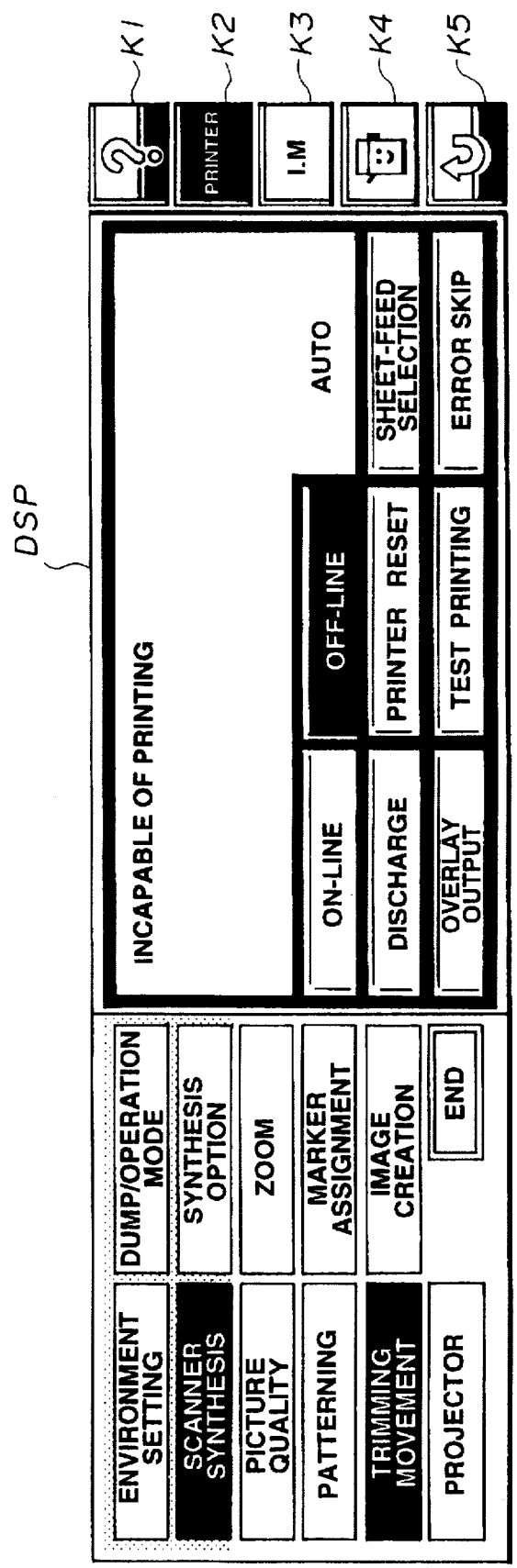

On the other hand, if the key y area "OK" is depressed in the state of the picture surface shown FIG. 40, the display picture surface of the display DSP is switched to the picture surface shown in FIG. 42. If the key area "trimming movement" is depressed in the state of the picture surface shown in FIG. 42, the display picture surface of the display DSP is switched to the picture surface shown in FIG. 41, and the assigned trimming movement is displayed in a graphic form. If the key area "OK" is depressed in the state of this display surface, the display picture surface of the display DSP is switched again to the picture surface shown in FIG. 42, and the operation of setting trimming movement is completed. If the key area "area clearance" is depressed in the state of the picture surface shown in FIG. 41, the display picture surface of the display DSP is switched to the picture surface shown in FIG. 42, so that an area for trimming movement can be assigned again.

FIGS. 43 through 47 are diagrams showing examples of picture surfaces for setting options in scanner synthesis in the composite-image forming apparatus of the present invention, and correspond to picture surfaces for operations of setting zoom.

Figure 43:
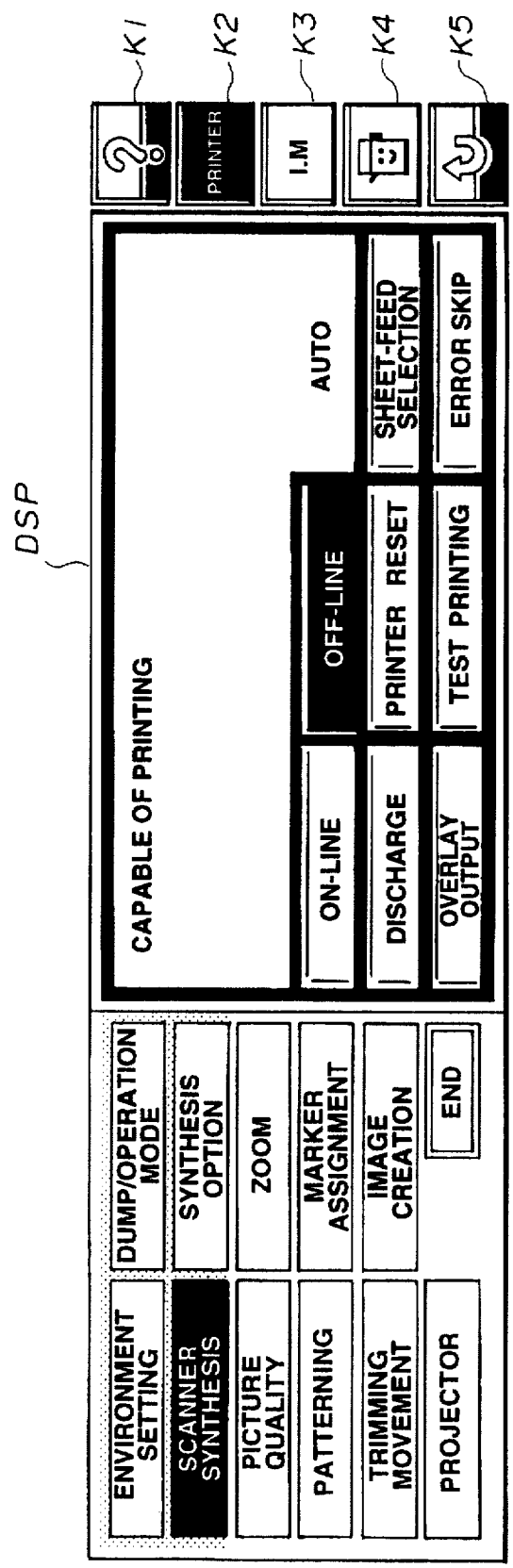
Figure 44:
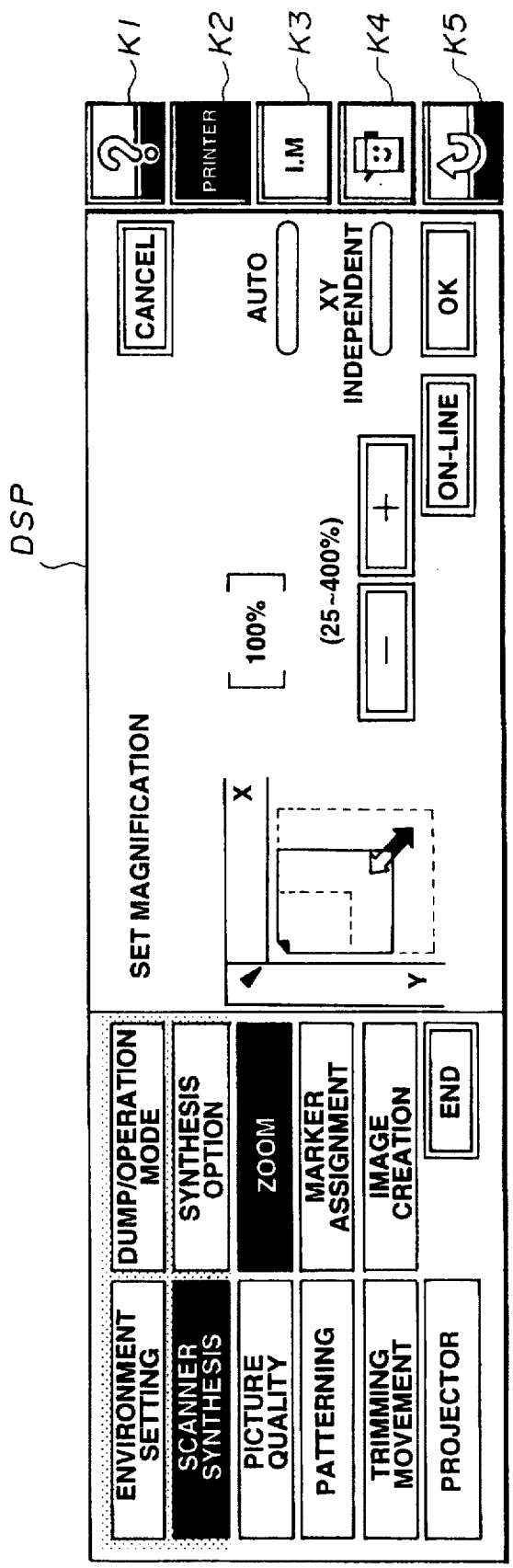
Figure 45:
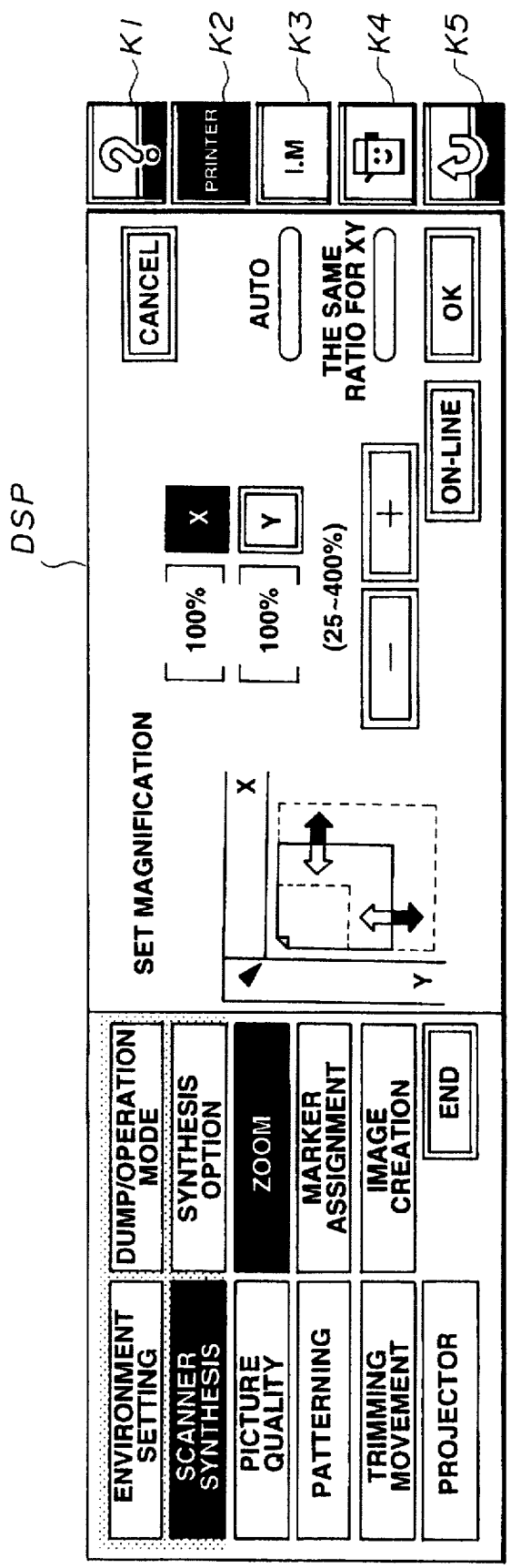

If the key area "trimming movement" is depressed in a state in which the picture surface shown in FIG. 43 is displayed on the display DSP, i.e., the key area "scanner synthesis" is displayed in a density-reversal state, the display picture surface of the display DSP is switched to the picture surface shown in FIG. 44, so that a key area "zoom" is displayed in a density-reversal state. If a key area "XY independent" is depressed while the picture surface shown in FIG. 44 is displayed, the display picture surface of the display DSP is switched to the picture surface shown in FIG. 45, so that independent zoom-ratio setting (20%–400% from a magnification of 100%) in the vertical and horizontal directions can be performed. If a key area "the same ratio for XY" is depressed in the state of the picture surface shown in FIG. 45, the display picture surface of the display DSP is switched to the picture surface shown in FIG. 44. If the key area "OK" is depressed in the state of the picture surface shown in FIG. 44 or 45, the display picture surface of the display DSP is switched to the picture surface shown in FIG. 43, and the zoom-setting operation is completed.

Figure 46:
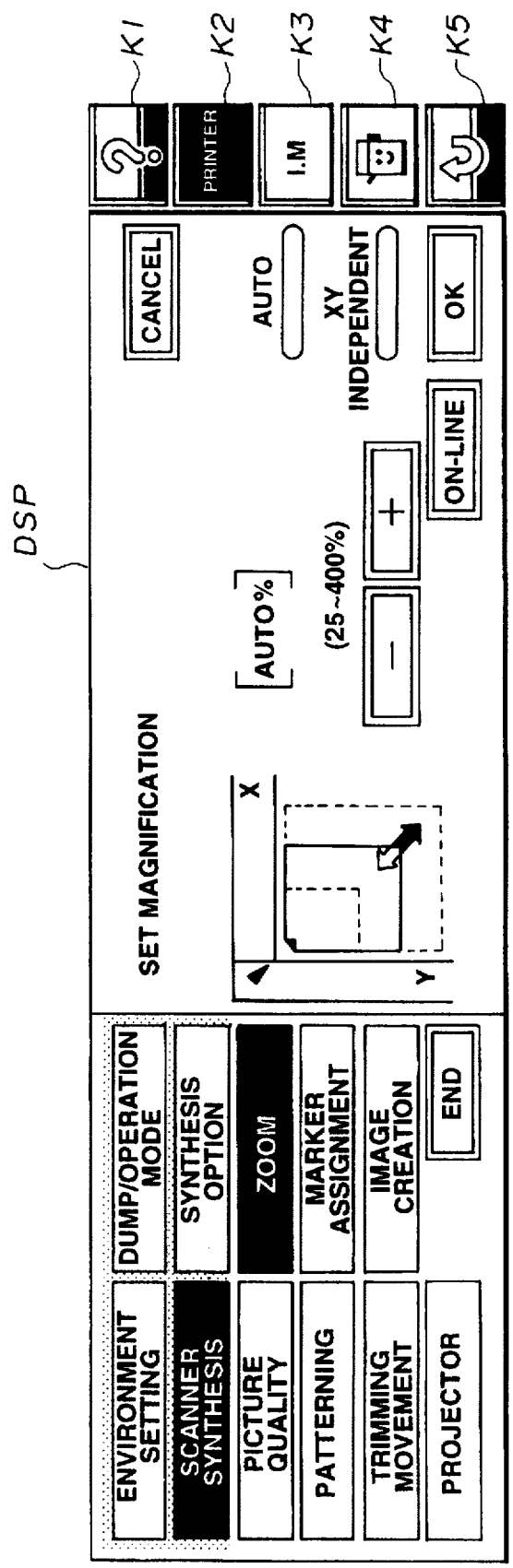
Figure 47:
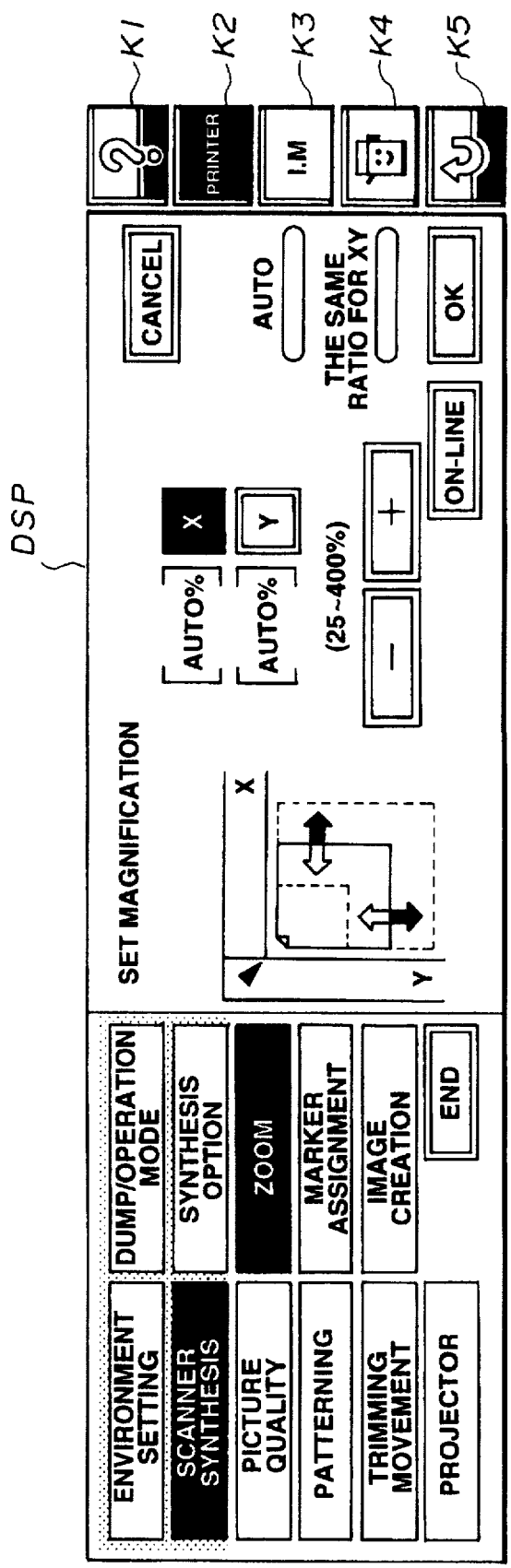

On the other hand, if a key area "auto" is selected in the state of the picture surface shown in FIG. 44, the display picture surface of the display DSP is switched to the picture surface shown in FIG. 46. If the key area "XY independent" is depressed while the picture surface shown in FIG. 46 is displayed, the display picture surface of the display DSP is switched to the picture surface shown in FIG. 47, so that independent zoom-ratio setting (20%–400% from a magnification of 100%) in the vertical and horizontal directions can be performed. If a key area "the same ratio for XY" is depressed in the state of the picture surface shown in FIG. 47, the display picture surface of the display DSP is switched to the picture surface shown in FIG. 46. If the key area "OK" is depressed in the state of the picture surface shown in FIG. 46 or 47, the display picture surface of the display DSP is switched to the picture surface shown in FIG. 43, and the zoom-setting operation is completed.

As described above, by performing various kinds of operations for scanner synthesis, a part of a letterhead, a logo mark, an illustration or the like is scanned in a rectangular form and is synthesized with data to be printed, and the obtained image can be printed on one sheet.

As described above, according to the present invention, control means prohibits the operating state of image output means from returning to a state present before an abnormal feeding state has been detected, by determining a state of setting of an image synthesis mode by the synthesis means, and a state of an input indicating the completion of release of the abnormal feeding after detection means has detected the released state from abnormal feeding, and for returning the operating state of the image output means to the state present before the abnormal feeding state has been detected based on a release instruction which has been input. Hence, it is possible to resume image synthesis processing for an appropriate original and at an appropriate timing even if variations are present in the adjusting time required for the operator to release a jam from the detection of the abnormal sheet feeding.

The individual components shown in outline or designated by blocks in the drawings are all well known in the composite-image forming apparatus arts and their sepcific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:
    means for inputting image information from an external apparatus;
    means for forming an image on a recording medium;
    means for reading an original;
    means for detecting a jam of the recording medium;
    means for being manually operated by an operator; and
    means for controlling a recovery operation from a jammed state,
    wherein said apparatus includes a first mode for forming an image corresponding to the input image information, and a second mode for forming a composite image by synthesizing the image corresponding to the input image information with an image of the original read by said reading means, and
    wherein said control means starts the recovery operation from the jammed state in response to release of the jam in the first mode, and starts the recovery operation from the jammed state in response to a manual operation of said operation means by the operator after release of the jam in the second mode.

2. An apparatus according to claim 1, wherein said apparatus can mount original-feeding means, and wherein when the jam has occurred while the image has been formed using said original-feeding means, said control means starts the recovery operation from the jammed state in response to the manual operation of said operation means by the operator after the release of the jam even in the second mode.

3. An apparatus according to claim 1, further comprising means for displaying a message to urge the operator to perform a manual operation for jam recovery.

4. An apparatus according to claim 1, further comprising setting means for setting a number of pages to be formed in the second mode, wherein said apparatus releases the second mode in response to an end of image formation for the set number of pages.

5. A composite-image forming apparatus, to which an automatic original-feeding device for feeding an original to an original-reading position can be connected, said apparatus comprising:
    first image input means for converting an image of the original into a first image signal and for inputting the first image signal;
    image output means for forming an image on a recording medium based on the input first image signal;
    second image input means for inputting desired second image information from the outside;
    region assignment means for assigning a desired output image region within the second image information input from the outside;
    synthesis means for synthesizing the second image information corresponding to the desired output image region assigned by said region assignment means with the first image information;
    detection means for detecting an abnormal feeding state and a released state from abnormal feeding of the recording medium fed to image output means; and
    control means for (a) prohibiting an operation state of said image output means from returning to a state present before the abnormal feeding state has been detected in accordance with determination by said control means of (i) a state of setting of an image synthesis mode by said synthesis means, and (ii) a state of an input indicating the completion of release of the abnormal feeding after said detection means has detected the released state from abnormal feeding, and for (b) returning the operation state of said image output means to the state present before the abnormal feeding state has been detected based on a release instruction which has been input.

6. An apparatus according to claim 5, wherein said control means prohibits the operation state of said image output means from returning to the state present before the abnormal feeding state has been detected, in accordance with determination by said control means of the state of setting of the image synthesis mode by said synthesis means, a state of an image of the original, and the state of the input indicating the completion of release of the abnormal feeding.

7. An apparatus according to claim 6, further comprising image-data storage means for storing the image of the original, wherein said control means does not prohibit the operation state of said image output means from returning to the state present before the abnormal feeding state has been detected when said control means determines that image data present before the the abnormal feeding state has been detected is stored in said image-data storage means.

8. An apparatus according to claim 6, wherein said control means does not prohibit the operation state of said image output means from returning to the state present before the abnormal feeding state has been detected when said control means determines that the original present before the abnormal feeding state has been detected can be converted into the first image signal.

9. An image forming apparatus comprising:
    input means for inputting image information from an external apparatus;
    image forming means for forming an image from the image information received from the external apparatus on a recording medium;
    reading means for reading an original;
    detecting means for detecting a jammed state resulting from a jam of the recording medium;
    means for manually operating said image forming apparatus by an operator; and
    control means for controlling a recovery operation from a jammed state,
    wherein said apparatus includes a first mode in which said control means starts the recovery operation from the jammed state in response to release of the jam without waiting for a manual operation of said manual operation means by the operator after release of the jam, and a second mode in which said control means starts the recovery operation from the jammed state in response to a manual operation of said manual operation means by the operator after release of the jam.

10. An apparatus according to claim 9, wherein said apparatus can mount original-feeding means, and wherein when the jam has occurred while the image has been formed using said original-feeding means, said apparatus operates in the first mode.

11. An apparatus according to claim 9, further comprising means for displaying a message to urge the operator to perform a manual operation for jam recovery in the second mode.

12. An apparatus according to claim 9, further comprising setting means for setting a number of pages to be formed in the second mode, wherein said apparatus releases the second mode in response to an end of image formation for the set number of pages.

13. An image forming apparatus according to claim 9, further comprising memory means for storing at least one page of image data,
wherein said apparatus operates in the first mode, when the jam has occurred while the image has been formed using said memory means.

14. An image forming apparatus according to claim 13, wherein said apparatus operates in the second mode, when the jam has occurred while the image has been formed without using said memory means.

15. An image forming apparatus according to claim 13, further comprising determining means for determining whether or not the recovery operation can be performed using a content of said memory means.

16. An image forming apparatus according to claim 15, wherein if a determination by said determining means is positive, then said apparatus operates in the first mode when the jam has occurred during an image formation, and if the determination by said determining means is negative, then said apparatus operates in the second mode when the jam has occurred during an image formation.

17. A copying apparatus comprising:
reading means for reading an original;
image forming means for forming an image on a recording medium;
detecting means for detecting a jammed state of the recording medium;
memory means for storing at least one page of image data;
means for manually operating said copying apparatus by an operator; and
control means for controlling a recovery operation from a jammed state,
wherein said apparatus includes a first mode in which said control means starts the recovery operation from the jammed state in response to release of the jam without waiting for a manual operation of said manual operation means by the operator after release of the jam, and a second mode in which said control means starts the recovery operation from the jammed state in response to a manual operation of said manual operation means by the operator after release of the jam.

18. A copying apparatus according to claim 17, wherein said apparatus operates in the first mode, when the jam has occurred while the image has been formed using said memory means, and said apparatus operates in the second mode, when the jam has occurred while the image has been formed without using said memory means.

19. A copying apparatus according to claim 17, further comprising determining means for determining whether or not the recovery operation can be performed using a content of said memory means.

20. A copying apparatus according to claim 19, wherein if the determination by said determining means is positive, then said apparatus operates in the first mode when the jam has occurred during an image formation, and if the determination by said determining means is negative, then said apparatus operates in the second mode when the jam has occurred during an image formation.

21. An image forming apparatus comprising: input means for inputting image information from an external apparatus;
image forming means for forming an image from the image information received from the external apparatus on a recording medium;
reading means for reading an original;
detecting means for detecting a jammed state resulting from a jam of the recording medium;
means for manually operating said image forming apparatus by an operator;
control means for controlling a recovery operation from a jammed state;
memory means for storing at least one page of image data; and
determining means for determining whether or not the recovery operation can be performed using a content of said memory means,
wherein said apparatus includes a first mode in which said control means starts the recovery operation from the jammed state in response to release of the jam, and a second mode in which said control means starts the recovery operation from the jammed state in response to a manual operation of said manual operation means by the operator after release of the jam,
wherein said apparatus operates in the first mode, when the jam has occurred while the image has been formed using said memory means, and
wherein if a determination by said determining means is positive, then said apparatus operates in the first mode when the jam has occurred during an image formation, and if the determination by said determining means is negative, then said apparatus operates in the second mode when the jam has occurred during an image formation.

22. A copying apparatus comprising:
reading means for reading an original;
image forming means for forming an image on a recording medium;
detecting means for detecting a jammed state of the recording medium;
memory means for storing at least one page of image data;
means for manually operating said copying apparatus by an operator;
control means for controlling a recovery operation from a jammed state; and
determining means for determining whether or not the recovery operation can be performed using a content of said memory means,
wherein said apparatus includes a first mode in which said control means starts the recovery operation from the jammed state in response to release of the jam, and a second mode in which said control means starts the recovery operation from the jammed state in response to a manual operation of said manual operation means by the operator after release of the jam, and
wherein if the determination by said determining means is positive, then said apparatus operates in the first mode when the jam has occurred during an image formation, and if the determination by said determining means is negative, then said apparatus operates in the second mode when the jam has occurred during an image formation.

* * * * *

UNITED STATES PATENT AND TRADEMARK OFFICE
CERTIFICATE OF CORRECTION

PATENT NO. : 5,745,661
DATED : April 28, 1998
INVENTOR(S) : Shokyo Koh, et al.

It is certified that error appears in the above-identified patent and that said Letters Patent is hereby corrected as shown below:

Column 15, line 12, delete "awaits" and insert therefor --waits--.

Column 17, line 53, delete "y".

Column 19, line 1, delete "sepcific" and insert therefor --specific--.

Column 20, line 31, delete "the", first occurrence.

Signed and Sealed this

Tenth Day of November 1998

Attest:

BRUCE LEHMAN

*Attesting Officer*   *Commissioner of Patents and Trademarks*